(12) United States Patent
Swartz et al.

(10) Patent No.: US 11,040,490 B2
(45) Date of Patent: Jun. 22, 2021

(54) METHOD AND APPARATUS FOR PLATEN MODULE FOR AUTOMATED COMPOSITE-BASED ADDITIVE MANUFACTURING MACHINE

(71) Applicant: Impossible Objects, Inc., Northbrook, IL (US)

(72) Inventors: Robert Swartz, Highland Park, IL (US); Eugene Gore, Des Plaines, IL (US)

(*) Notice: Subject to any disclaimer, the term of this patent is extended or adjusted under 35 U.S.C. 154(b) by 337 days.

(21) Appl. No.: 15/923,335

(22) Filed: Mar. 16, 2018

(65) Prior Publication Data

US 2018/0264725 A1 Sep. 20, 2018

Related U.S. Application Data

(60) Provisional application No. 62/473,084, filed on Mar. 17, 2017.

(51) Int. Cl.
*B29C 64/245* (2017.01)
*B33Y 40/00* (2020.01)
(Continued)

(52) U.S. Cl.
CPC .......... *B29C 64/245* (2017.08); *B29C 64/165* (2017.08); *B29C 64/357* (2017.08);
(Continued)

(58) Field of Classification Search
CPC .. B41J 11/0085; B29C 64/245; B29C 64/357; B29C 64/165
See application file for complete search history.

(56) References Cited

U.S. PATENT DOCUMENTS

| 2,354,166 A | * | 7/1944 | Windham | .............. | D06C 29/00 |
| | | | | | 101/494 |
| 3,431,166 A | | 3/1969 | Mizutani | | |

(Continued)

FOREIGN PATENT DOCUMENTS

| CN | 101181776 A | 5/2008 |
| CN | 201329424 B1 | 10/2009 |

(Continued)

OTHER PUBLICATIONS

International Search Report for PCT/US12/52946 ("Methods and Apparatus for 3D Fabrication"), dated Jan. 10, 2013.

(Continued)

*Primary Examiner* — Marc C Howell
*Assistant Examiner* — John J DeRusso
(74) *Attorney, Agent, or Firm* — Robert Greenspoon; Flachsbart & Greenspoon, LLC

(57) ABSTRACT

A printer platen component of an apparatus for automated manufacturing of three-dimensional composite-based objects for printing onto substrate sheets. The platen solves two problems: 1) holding the sheet down without allowing it to move while printing; and 2) getting rid of excess printing fluid. The platen comprises a plate with a number of air channel openings used for suction to hold the sheet in place, a bed of wire used to suspend the sheet and to keep the sheet straight, a depressed reservoir where printing fluid accumulates, a number of punching holes, a number of screws which serve as release sites for the sheet and cooperate with tips of a gripper to transfer the sheet to the platen, and a rough surface to additionally help hold down the sheet and keep it from moving. The platen is connected to an air plenum resting underneath the main plate to provide the suction.

12 Claims, 25 Drawing Sheets

(51) Int. Cl.
*B33Y 30/00* (2015.01)
*B29C 64/165* (2017.01)
*B33Y 10/00* (2015.01)
*B29C 64/357* (2017.01)

(52) U.S. Cl.
CPC .............. *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 4,312,268 A | 1/1982 | King et al. | |
| 4,393,389 A | 7/1983 | Rasekhi et al. | |
| 4,453,694 A | 6/1984 | Andreasson | |
| 4,675,825 A * | 6/1987 | DeMenthon | G05B 19/41 700/160 |
| 4,863,538 A | 9/1989 | Deckard | |
| 5,176,949 A | 1/1993 | Allagnat et al. | |
| 5,204,055 A | 4/1993 | Sachs et al. | |
| 5,260,009 A | 11/1993 | Penn | |
| 5,340,656 A | 8/1994 | Sachs et al. | |
| 5,364,657 A | 11/1994 | Throne | |
| 5,369,192 A | 11/1994 | Ko et al. | |
| 5,514,232 A | 5/1996 | Burns | |
| 5,637,175 A | 6/1997 | Feygin et al. | |
| 5,717,446 A * | 2/1998 | Teumer | B41J 2/01 347/102 |
| 5,876,550 A | 3/1999 | Feygin et al. | |
| 5,988,959 A | 11/1999 | Sugata | |
| 6,054,077 A * | 4/2000 | Comb | B29C 48/155 264/40.7 |
| 6,129,205 A * | 10/2000 | Ergenbright | B65G 17/064 198/852 |
| 6,147,138 A | 11/2000 | Hochsmann et al. | |
| 6,161,995 A | 12/2000 | Wakazono et al. | |
| 6,350,009 B1 * | 2/2002 | Freund | B41J 11/0025 347/101 |
| 6,471,800 B2 | 10/2002 | Jang et al. | |
| 6,551,038 B1 | 4/2003 | Sugata et al. | |
| 6,596,224 B1 | 7/2003 | Sachs et al. | |
| 6,632,054 B2 | 10/2003 | Geiger et al. | |
| 6,733,109 B1 * | 5/2004 | Lorenz | B41J 11/0065 347/36 |
| 6,740,185 B2 | 5/2004 | Baldwin | |
| 6,780,368 B2 | 8/2004 | Liu et al. | |
| 8,377,547 B2 | 2/2013 | Noguchi et al. | |
| 2002/0041303 A1 * | 4/2002 | Yoshinaga | B41J 11/0065 347/22 |
| 2002/0104935 A1 | 8/2002 | Schweizer | |
| 2004/0070582 A1 | 4/2004 | Smith et al. | |
| 2004/0112523 A1 | 6/2004 | Crom et al. | |
| 2005/0059757 A1 | 3/2005 | Bredt et al. | |
| 2006/0061618 A1 | 3/2006 | Hernandez et al. | |
| 2007/0241482 A1 | 10/2007 | Giller et al. | |
| 2008/0006958 A1 | 1/2008 | Davidson | |
| 2008/0260954 A1 | 10/2008 | Paton et al. | |
| 2009/0255428 A1 | 10/2009 | Stiel | |
| 2009/0321979 A1 | 12/2009 | Hiraide | |
| 2010/0302326 A1 | 12/2010 | Morohoshi et al. | |
| 2011/0045724 A1 | 2/2011 | Bahukudumbi | |
| 2011/0101564 A1 | 5/2011 | Keenihan et al. | |
| 2011/0121491 A1 | 5/2011 | Costabeber | |
| 2012/0059503 A1 | 3/2012 | Pax et al. | |
| 2013/0171431 A1 | 7/2013 | Swartz et al. | |
| 2014/0238173 A1 | 8/2014 | Swartz et al. | |
| 2014/0257549 A1 | 9/2014 | Swartz et al. | |
| 2014/0285602 A1 * | 9/2014 | Sasaki | B41J 11/007 347/102 |
| 2015/0137423 A1 | 5/2015 | Ding | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0082695 A1 | 3/2016 | Swartz et al. | |
| 2016/0339645 A1 | 11/2016 | Swartz et al. | |
| 2017/0129183 A1 * | 5/2017 | Dufort | B29C 64/35 |

FOREIGN PATENT DOCUMENTS

| | | |
|---|---|---|
| JP | H11236541 | 8/1999 |
| WO | WO-2007114895 A2 | 10/2007 |
| WO | WO-2013010108 A1 | 1/2013 |
| WO | WO-2013033273 A2 | 3/2013 |
| WO | WO-2014134224 A2 | 9/2014 |

OTHER PUBLICATIONS

J. Eltgen, A Short Review of Magnetography and Its Related Materials Problems, Ind. Eng. Chem. Prod. Res. Dev., vol. 24, No. 2, 1985, pp. 196-201.

Extended European Search Report, from EP Application No. 12828967 (EP20120828967) ("Methods and Apparatus for 3D Fabrication"), dated Jun. 9, 2015.

International Search Report for International Applicaton No. PCT/US14/18806 ("Methods and Apparatus for Three-Dimensional Printed Composites"), dated Aug. 5, 2014.

Invitation to Pay Additional Fees for International Applicaton No. PCT/US14/18806 ("Methods and Apparatus for Three-Dimensional Printed Composites"), dated May 6, 2014.

Decision on Protest for International Applicaton No. PCT/US14/18806 ("Methods and Apparatus for Three-Dimensional Printed Composites"), dated Jun. 19, 2014.

Restriction Requirement in U.S. Appl. No. 13/582,939 ("Methods and Apparatus for 3D Fabrication"), dated Sep. 30, 2015.

Non-Final Rejection in U.S. Appl. No. 13/582,939 ("Methods and Apparatus for 3D Fabrication"), dated Mar. 29, 2016.

Final Rejection in U.S. Appl. No. 13/582,939 ("Methods and Apparatus for 3D Fabrication"), dated Oct. 7, 2016.

Non-Final Rejection in U.S. Appl. No. 14/835,690 ("Apparatus for Fabricating Three-Dimensional Printed Composites"), dated Nov. 15, 2016.

Non-Final Rejection in U.S. Appl. No. 14/566,661 ("Tow Stabilization Method and Apparatus"), dated Mar. 21, 2017.

Applicant Initiated Interview Summary in U.S. Appl. No. 14/703,372 (" . . . Flattened Substrate Sheets"), dated Feb. 9, 2017.

Invitation to Pay Additional Fees for International Application No. PCT/US17/17672 ("Method/Apparatus Automated Composite-Based Additive Manufacturing"), dated Apr. 17, 2017.

Non-Final Rejection in U.S. Appl. No. 13/582,939 ("Methods and Apparatus for 3D Fabrication"), dated Apr. 27, 2017.

Decision on Protest for PCT/US17/17672 ("Method and Apparatus for Automated Composite-Based Additive Manufacturing"), dated May 26, 2017.

Final Rejection in U.S. Appl. No. 14/190,912 ("Methods and Apparatus for Construction of Machine Tools"), dated Jun. 13, 2017.

Non-Final Rejection in U.S. Appl. No. 14/199,603 ("Methods and Apparatus for Photosculpture"), dated Apr. 12, 2016.

Restriction Requirement in U.S. Appl. No. 14/566,661 ("Tow Stabilization Method and Apparatus"), dated Dec. 9, 2016.

Restriction Requirement in U.S. Appl. No. 14/703,372 ("Methods and Apparatus for Three Dimensional Printed Composites Based on Flattened Substrate Sheets"), dated Jul. 25, 2016.

Non-Final Rejection in U.S. Appl. No. 14/703,372 ("Methods and Apparatus for Three Dimensional Printed Composites Based on Flattened Substrate Sheets"), dated Dec. 22, 2016.

International Search Report and Written Opinion in International Application No. PCT/US16/62319 ("Additive Manufacturing Method and Apparatus"), dated Jan. 23, 2017.

International Search Report and Written Opinion in International Application No. PCT/US16/62356 (" . . . Metal Matrix Composites . . . "), dated Jan. 23, 2017.

Extended European Search Report in EP20140757160 ("Method and Apparatus for Three-Dimensional Printed Composites"), dated Jul. 4, 2016.

(56) References Cited

OTHER PUBLICATIONS

Restriction in U.S. Appl. No. 14/190,912 ("Methods and Apparatus for Construction of Machine Tools"), dated Dec. 1, 2015.
Restriction in U.S. Appl. No. 14/190,912 ("Methods and Apparatus for Construction of Machine Tools"), dated Jun. 24, 2016.
Non-Final Rejection in U.S. Appl. No. 14/190,912 ("Methods and Apparatus for Construction of Machine Tools"), dated Oct. 3, 2016.

* cited by examiner

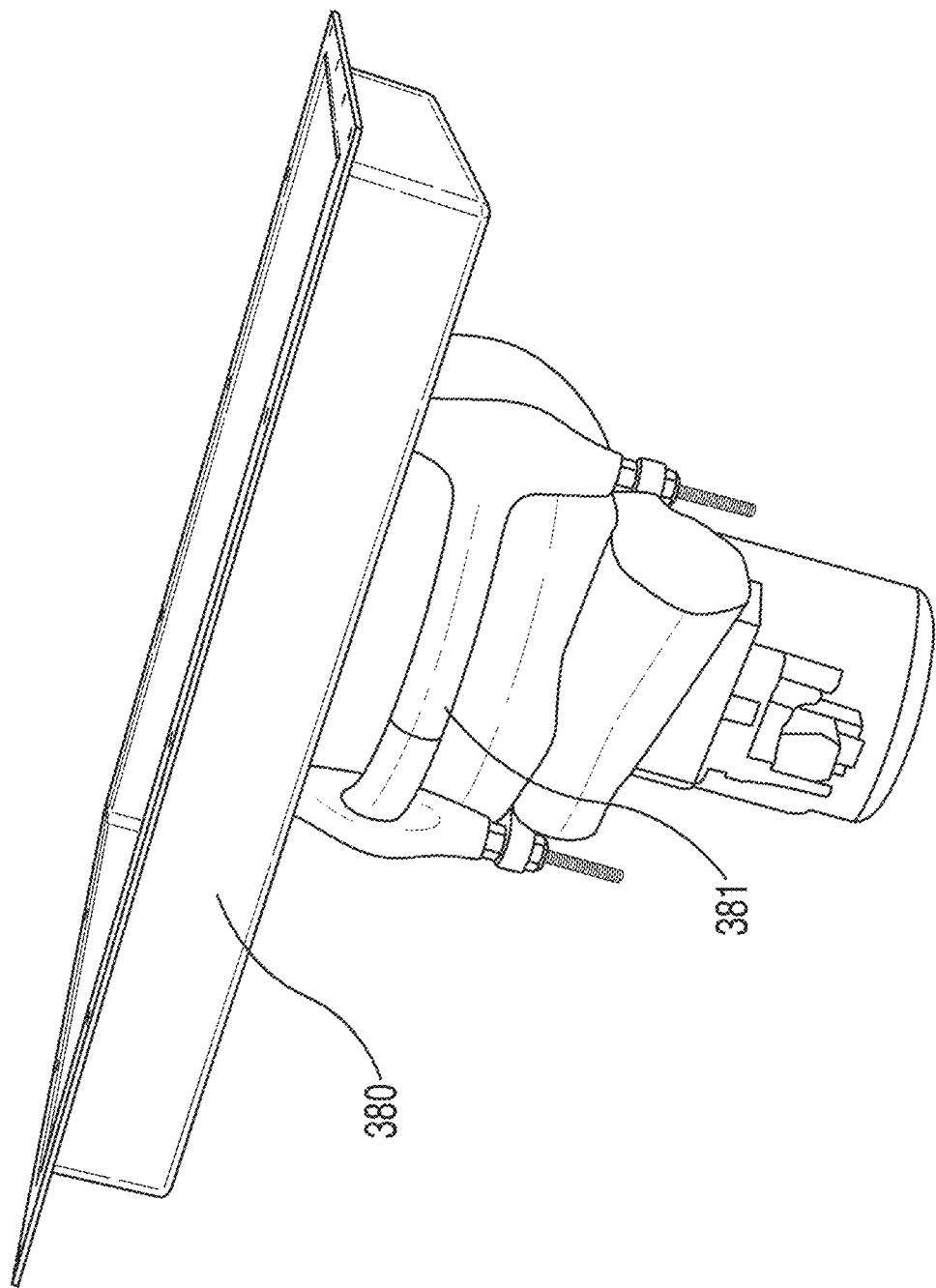

METHOD AND APPARATUS FOR PLATEN MODULE FOR AUTOMATED COMPOSITE-BASED ADDITIVE MANUFACTURING MACHINE

This application claims the benefit of U.S. Provisional Application No. 62/473,084, filed Mar. 17, 2017. Application No. 62/473,084 is hereby incorporated by reference in its entirety.

TECHNICAL FIELD OF THE INVENTION

The present invention relates generally to additive manufacturing and, in particular to an apparatus that is a printer platen component of a machine for automated manufacturing of three-dimensional composite-based objects.

BACKGROUND OF THE INVENTION

Additive manufacturing, such as three-dimensional printing, can be seen as largely a materials science problem. One of the limitations of current methods is a limited materials palette and slow build speeds.

These and other limitations of the prior art are avoided by a methodology known as Composite-Based Additive Manufacturing (CBAM). CBAM is described in full in co-pending U.S. patent application Ser. No. 13/582,939, filed Nov. 2, 2012, U.S. patent application Ser. No. 14/835,690, filed Aug. 25, 2015, and U.S. patent application Ser. No. 14/835,635, filed Aug. 25, 2015, each of which is incorporated fully herein by reference.

International application no. PCT/US17/17672, filed Feb. 13, 2017, and U.S. application Ser. No. 15/611,320, filed Jun. 1, 2017, describe a particular method and apparatus for automating Composite-Based Additive Manufacturing (CBAM). International application no. PCT/US17/17672 U.S. application Ser. No. 15/611,320 are incorporated fully herein by reference.

The present invention describes improvements made to the platen module, upon which a substrate sheet rests while it is being printed on by the printer and, optionally, also punched to create registration holes in the sheet for use later in the process. In theory, placing the sheet on the platen to print is a very simple process (place the sheet down, and print on it). However, after the sheet is placed over the platen to be printed, the problems are that 1) the sheet can move which will disturb the printing; the sheet may end up being placed in position which is not rectilinear to edges of the platen, The sheet may also not lie flat. In which case, the ink jet heads may collide with the sheet thus moving or displacing it; and 2) when the ink is printed, because the sheet is porous, a significant quantity of the ink passes through the sheet.

Both problems (1) and (2) need to be solved. The substrate sheet must be prevented from moving while it is being printed on (it will for example get snagged or knocked by the print head of the printer), and the sheet also needs to be held so that it does not move during punching. In addition, the excess ink must be controlled.

To address problem (2), one might use an absorbent sheet, which is placed on the platen to absorb the fluid that goes through. The absorbent sheet, however, needs to be dried or replaced when it becomes saturated with fluid. If the absorbent sheet gets too wet, it will transfer fluid back to the substrate sheets and contaminate, smear or min the images being printed on the sheets.

SUMMARY OF THE INVENTION

The present invention relates to a particular printer platen apparatus that is a part of an overall machine for automating Composite-Based Additive Manufacturing (CBAM).

To solve problems (1) and (2) described above, the sheet is held flat onto the platen, while at the same time the printing fluid passes through the sheet. A bed of wire, filament, fishing line or thread supports the substrate sheet above a reservoir so that any printing fluid that passes through the sheet continues downward beyond the supports and into the reservoir where it can be later emptied or evaporates. Holes in the platen through which air is drawn provide suction to hold down the substrate sheet while the substrate sheet is being printed and punched. Alternatively, mechanical hold downs can be used.

BRIEF DESCRIPTION OF THE DRAWINGS

FIG. 7E shows the vacuum attached to the air plenum.

DETAILED DESCRIPTION OF INVENTION

Overall Machine

Figure 1:
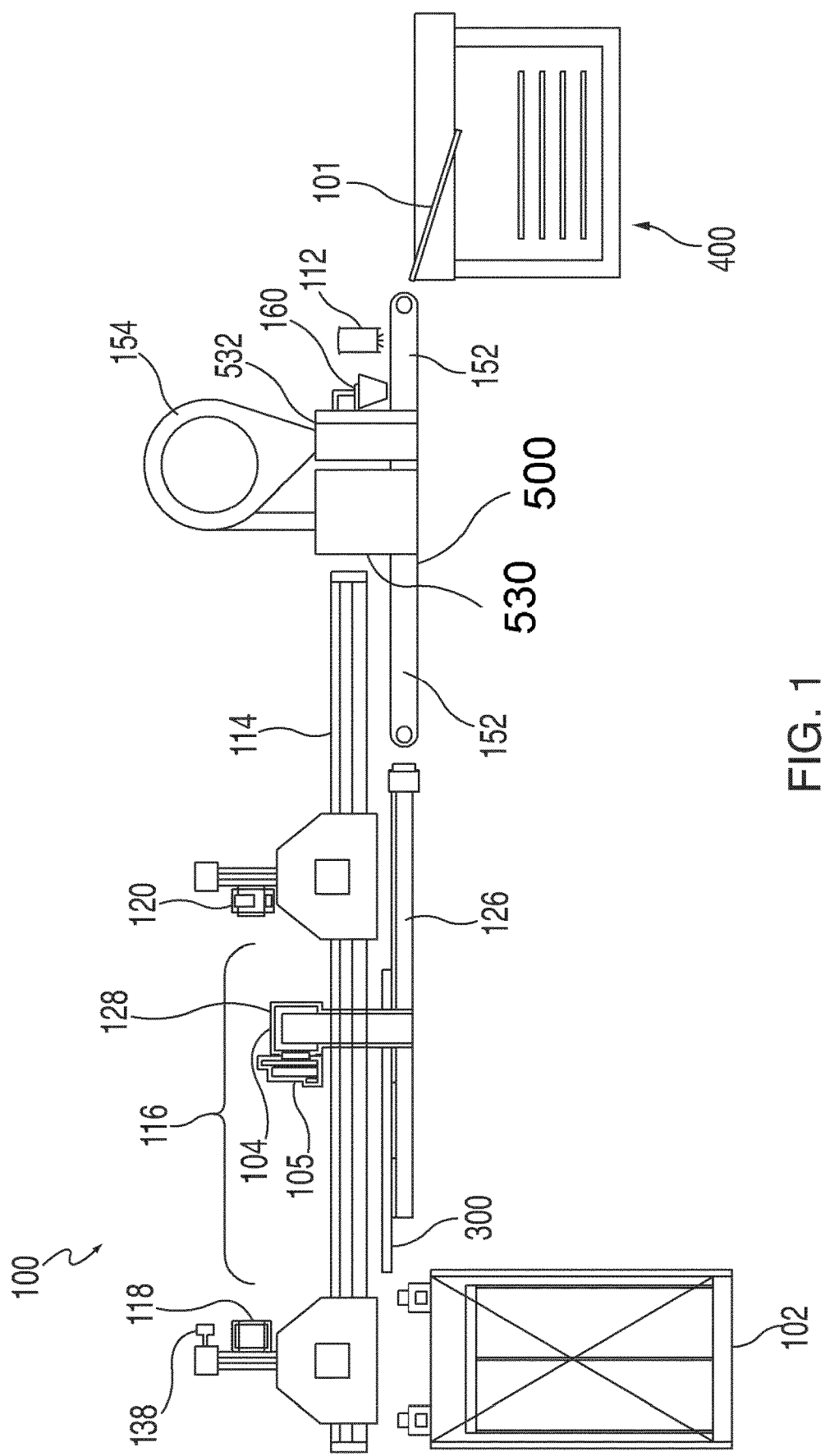
FIG. 1 is a schematic of an embodiment of an apparatus for composite-based additive manufacturing.

The CBAM process described in the incorporated prior applications (U.S. patent application Ser. Nos. 13/582,939, 14/835,690, and 14/835,635) is automated by performing the steps through a number of components or subsystems that operate in a coordinated manner. A machine that automates the steps is described in international application no. PCT/US17/17672 and U.S. application Ser. No. 15/611,320. The main components of an embodiment of the machine 100 are shown in FIG. 1, and include a material feeder 102, a printer 104, a powder system 500 comprising a powder applicator 530 and powder remover/recycler 532, an optional fuser 112, a transfer system, and other elements that serve to connect and control the various components. While components are shown in FIG. 1, various alternative and optional components are also suitable for use with the machine 100.

The material feeder 102 holds a stack of substrate sheets 101, such as carbon fiber sheets, and moves them into proper position so that a single sheet 101 at a time can be transferred to the printer platen 300 and printer 104. Sheets 101 are transferred to, and positioned for, the printer 104 by means of the transfer system. The printer 104 then deposits fluid onto a substrate sheet 101 as described in the incorporated prior applications (U.S. patent application Ser. Nos. 13/582,939, 14/835,690, and 14/835,635), and includes a punching mechanism for placing registration holes in the sheet 101 at desired locations. The registration holes are placed in precise, pre-defined positions relative to the position of the layer images printed onto the sheets. This can be accomplished by mounting the punches on the same frame that the printing mechanism is placed, or using other alignment mechanisms that are known in the art. The powder applicator 530 then deposits thermoplastic powder onto the substrate sheet 101, whereupon the powder adheres to the areas of the sheet 101 that has been made wet by the printer 104, i.e., the layer images. The powder remover/recycler 532 removes any powder that did not adhere to the sheet 101. The fuser 112, which is optional, heats the powder on the substrate sheet 101 in a manner sufficient to cause the powder to melt and thereby affix to the sheet 101, so that the powder remains on the sheet 101 when and if the underlying fluid from the printer 104 dries. This cycle is repeated for as many additional substrate sheets 101 as required for making a specified three-dimensional (3D) part, with each sheet 101 normally representing a layer of the 3D part. The apparatus also includes a stacker subsystem 400 for stacking the sheets in register as described in U.S. Provisional Patent Application No. 62/473,084.

Also shown in the embodiment of the machine depicted in FIG. 1 is a distance sensor 138, Coanda or felted-material gripper 118, XYZ positioner 116, X positioner 126, Y positioner 128, print heads 105, needle or felted-material gripper 120, rails 114, conveyor 152, cyclone 154, and air knife 160. These components are described in detail in international application no. PCT/US17/1772 and U.S. application Ser. No. 15/611,320.

Figure 2:
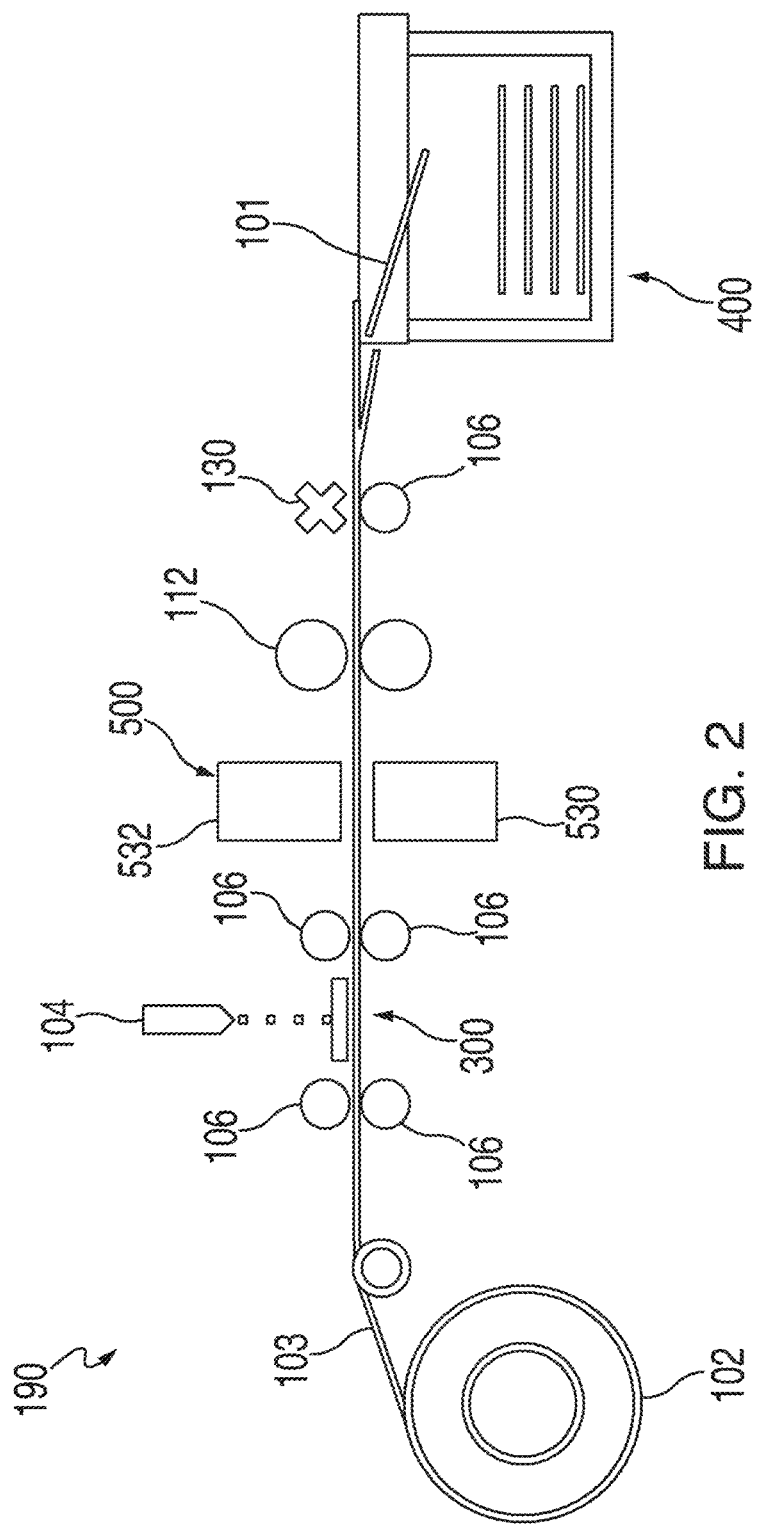
FIG. 2 depicts a roll-based continuous feed apparatus for composite-based additive manufacturing.
Figure 3:
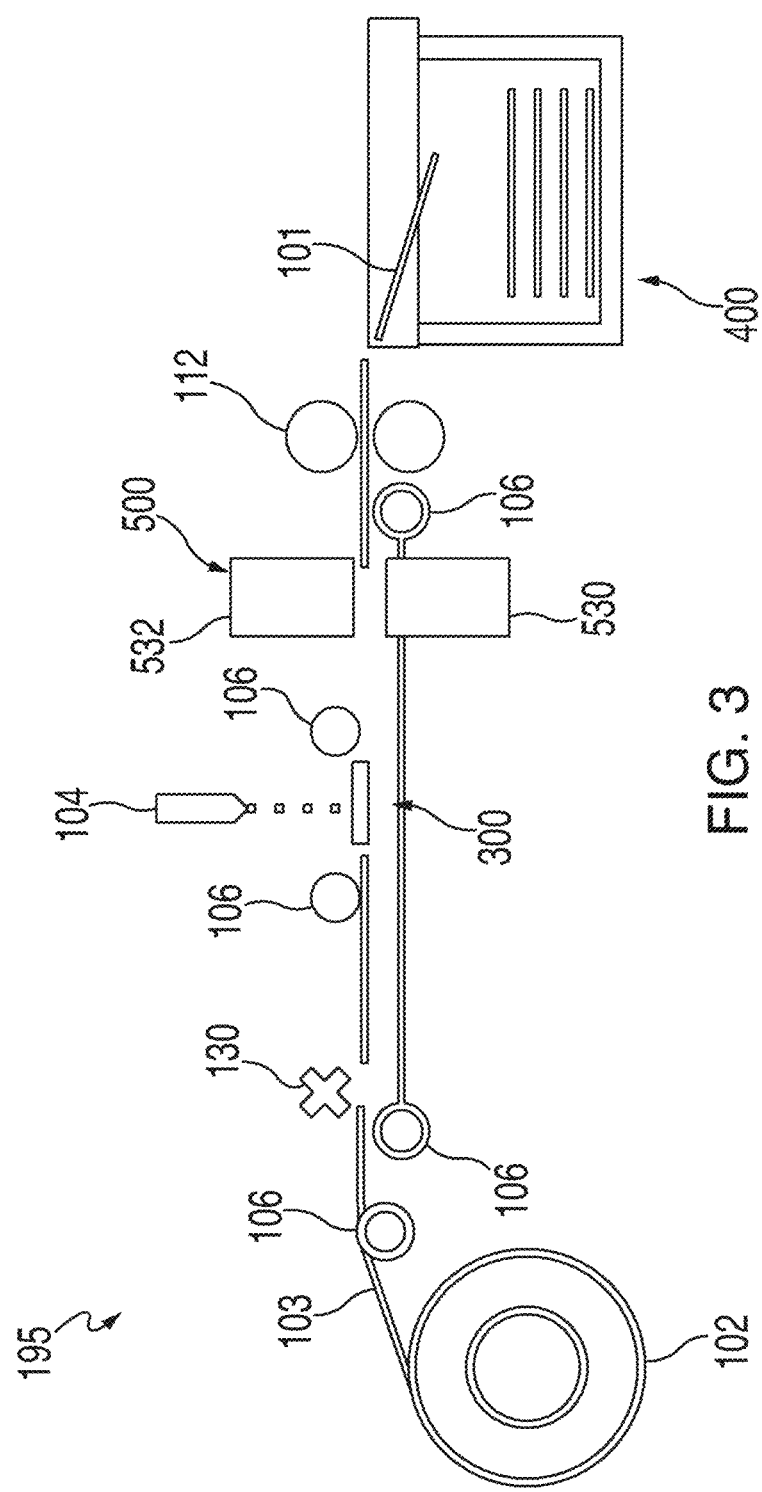
FIG. 3 depicts a roll-based roll to sheet apparatus for composite-based additive manufacturing.

Instead of using substrate sheets, a roll of substrate material may be used in the CBAM process and automated machine. FIG. 2 depicts a continuous feed roll implementation 190, and FIG. 3 depicts a roll to sheet implementation 195. In these embodiments, a roll of substrate material 102 is mounted and situated ahead of the printer 104. A tensioning system 103 together with feed rollers 106 are used to hold and advance the web defined by the length of the roll material fed through the system. The web 102 can extend through all of the components of the system—printer 104, recycler 500 comprising powder applicator 530 and powder remover/recycler 532, and, if present, fuser 112—and then be cut by a cutter 130 into single sheets 101 prior to stacking by the stacker subsystem 400. This is depicted in FIG. 2.

Alternatively, as depicted in FIG. 3 the web 102 may be cut by the cutter 130 into single sheets 101 at any prior point in the process. For example, the web 102 may be converted to a single sheet 101 prior to advancing the resulting sheet 101 onto the printer platen 300. The web 102 may be converted to a single sheet after the leading edge is situated on the platen 300. The web 102 may be converted to a single sheet after the printing operation is completed and before the resulting sheet is fed into the powder applicator 530, and so on.

Printer Platen Subsystem

Figure 4:
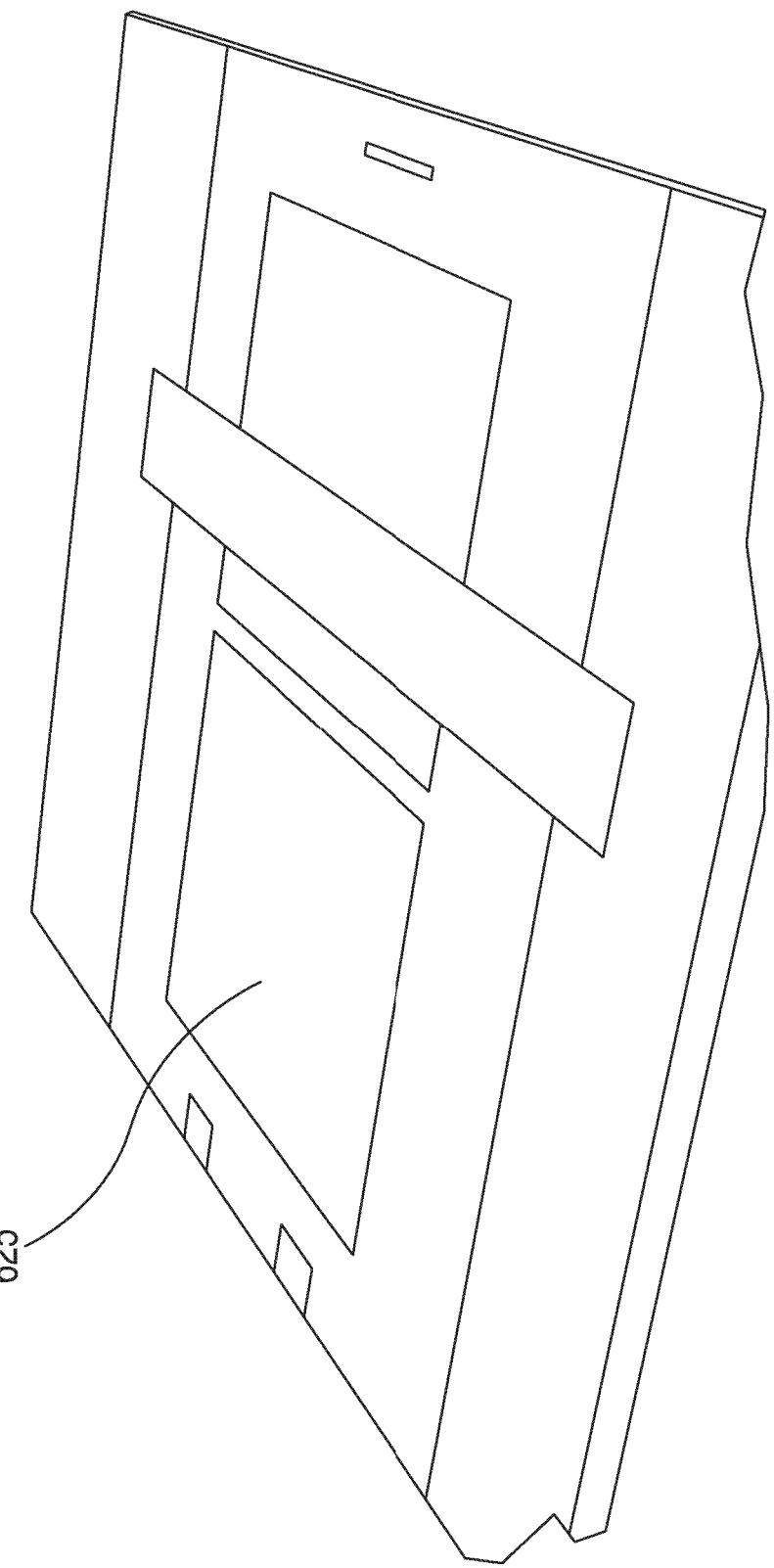
FIG. 4 depicts an absorbent sheet that was used prior to the platen improvements discussed herein.

The two important aspects of the platen subsystem 300 are 1) to be able to hold the sheet down sufficiently so that it does not move during printing or punching; and 2) to avoid the build up of excess fluid that could contaminate the sheet. As previously mentioned, prior to the platen of the present invention, there was absorbent layer (a "diaper") used to retain excess fluid from the printing process. FIG. 4 is an example of an absorbent sheet 625 that was previously used. Without the absorbent layer, the fluid would just be printed on a metal platen, would remain sitting on the metal, and would then get on the bottom of the substrate sheet. The sheet then would be unusable because of the excess fluid. The absorbent layer 625 would absorb the fluid—then a new sheet could be put down that would not become wet underneath. However, the absorbent sheet would become saturated, and replacing the absorbent sheet was a cumbersome and manual process.

To solve this printing problem, a platen with wire (or any other suitable support) supports the sheet and lets the fluid drain into a reservoir underneath and evaporate (or later emptied) so that no excess fluid gets onto the sheet. Since the sheet is supported by a wire which has a very small diameter, no appreciable excess fluid remains on the wire to contaminate the sheet. However the sheet needs to be held in place during printing and punching so it will not move. To solve the movement problem, the platen can have a vacuum underneath to hold the sheet in place, and high friction pads (sandpaper) situated at different places on the platen. Use of the vacuum is counterintuitive because the material of the sheet is porous (and in theory should not respond to the vacuum). Alternatively, a mechanical hold down may be used.

Figure 5:
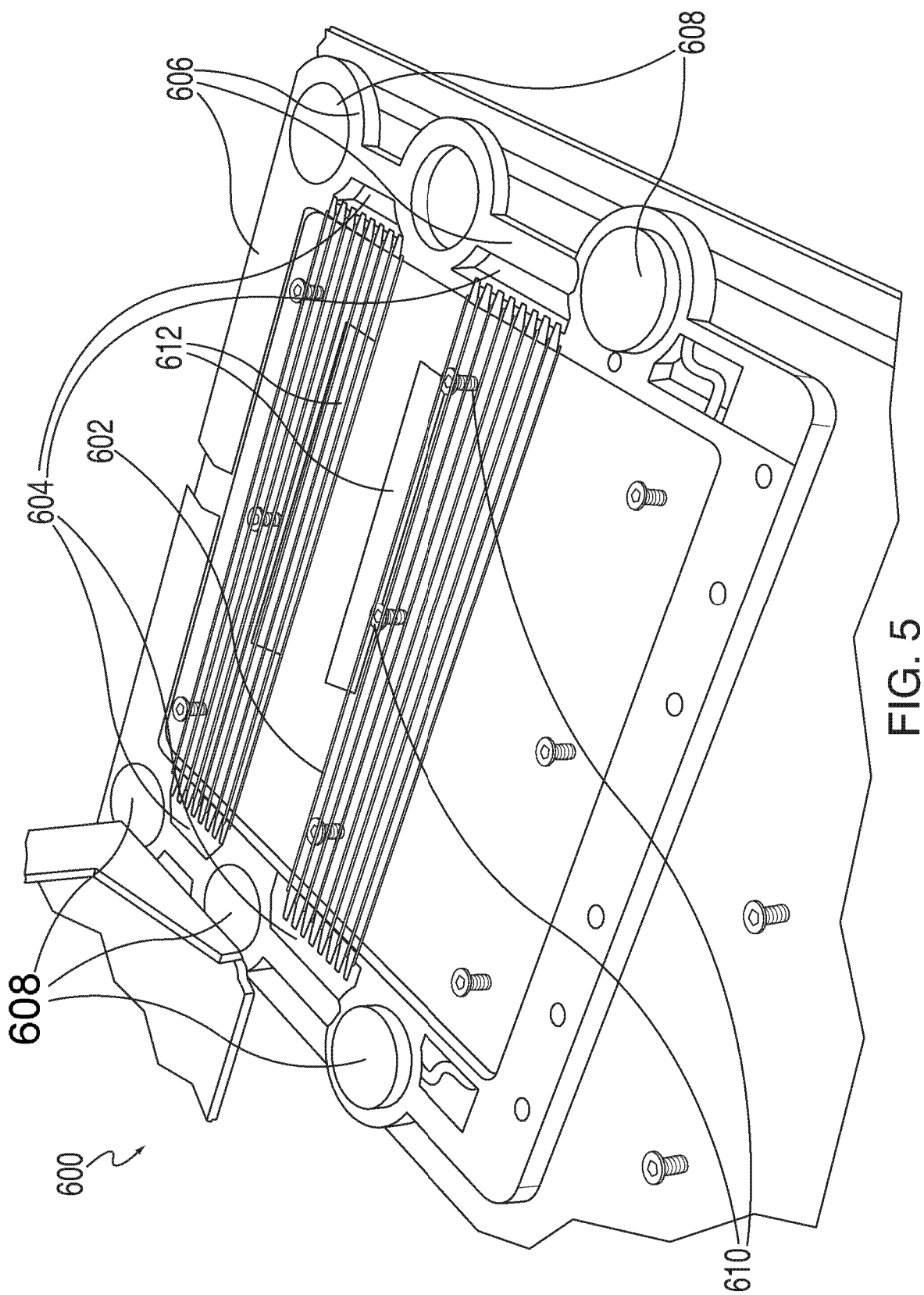
FIG. 5 shows an embodiment of a printer platen.

FIG. 5 shows one embodiment of a printer platen 600 that incorporates features of the present invention. In particular, the platen 600 comprises a bed of wire 602 on which the substrate sheet rests. In this way, there is nothing that the substrate sheet is sitting on that gets wet, and any excess fluid passes through a portion of the platen 600 and evaporates or is collected. To the extent that fluid lands on the wire, it tends to travel downward by gravity and, in any event, has been found not to build up in any volume that would materially contaminate the substrate sheets. The substrate sheet is retained by the platen 600, resisting any disturbance from the punching mechanism or the punching action. If the substrate sheet gets caught or is knocked by something while being printed (e.g., while the printhead 105 is moving over the sheet), the substrate sheet should not move with it. This problem is solved by air channel openings 604 through which air is sucked. Air travels through the openings 604 acting as a suction to hold the sheet in place. Although the sheet is porous, the suction is sufficient to hold the sheet in place. The platen 600 has punching sites 608 with wooden inserts that allow holes to be punched in the substrate sheet 101 while it is printing. Sandpaper 606 (or any another type of rough surface) encircles the punching sites 608, the connections between the punching sites as well as the rectangular perimeter of the platen 600. Friction between the rough surface and the substrate sheet additionally helps to prevent the substrate sheet from moving during printing or punching. A depression 612 allows ink to accumulate.

Figure 6:
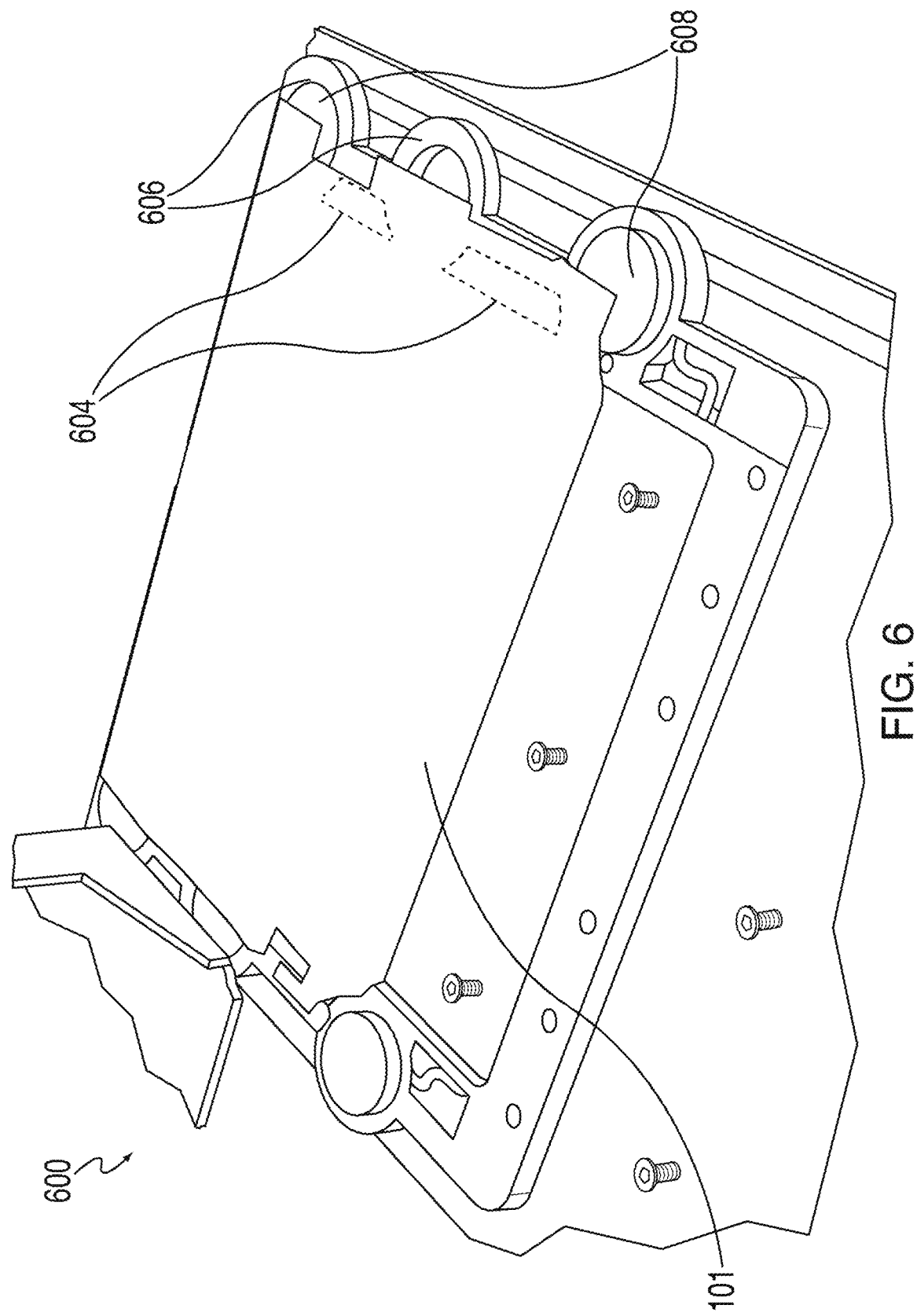
FIG. 6 shows an embodiment of a printer platen with a substrate sheet placed on top ready for printing.

FIG. 6 shows this embodiment, including printer platen 600 with a substrate sheet 101 placed on top ready to be printed upon. While the substrate sheet 101 rests on the openings 604, a vacuum (or a hold-down) connected to the underside of the openings draws air down to act as a suction to hold the sheet 101 in place. The sandpaper 606 (or rough surface) is used to provide additional retention against movement of the substrate sheet 101 in the X-Y direction.

Ink fluid should not accumulate in such a way as to contaminate sheets when they are placed on the platen. There is a reservoir or depression 612 (see FIG. 5) in the platen 600 so that the ink can accumulate there without contaminating the sheet. The platen 600 also has a plurality of screws 610 (see FIG. 5) made of ferromagnetic material that engage magnetic tips of spring-loaded pins 119 of a gripper 118 (see FIG. 12) of a transfer system such that the substrate sheet 101 is captured between the spring-loaded pins 119 of the gripper 118 and the ferromagnetic tips 610 of the platen 600. In order to pick up the sheet, felt 121 from the gripper 118 is used. In order to separate the sheet 101 from the felt 121, the spring-loaded pins 119 in conjunction with the tips 610 of the platen 600 are used. This is discussed in more detail in international application no. PCT/US17/17672 and U.S. application Ser. No. 15/611,320.

Figure 7A:
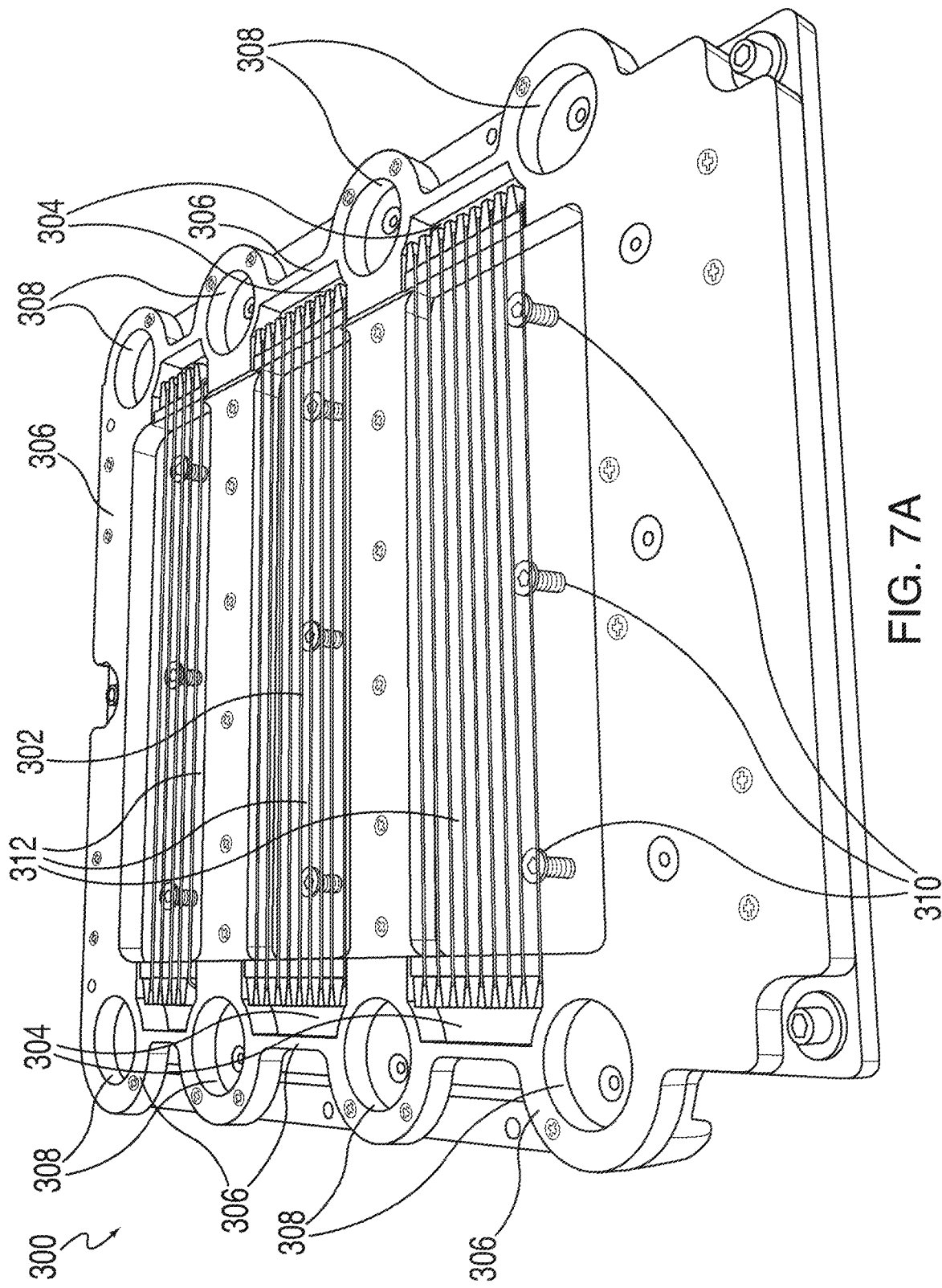
FIG. 7A shows another embodiment of the printer platen.

FIG. 7A shows a second embodiment of the printer platen 300. Like platen 600, platen 300 has a bed of wire 302, air opening channels 304 for suction, rough surface areas 306 for frictional resistance, punching sites 308 (where wooden or other type of insert will be inserted), and a number of ferromagnetic screws 310 to engage the tips of a gripper (all of which serve the same function as they did with respect to platen 600).

The platen 300, via the punch sites 308, allows for punching holes in the sheet during printing. The punching sites 308 have a space for wooden (or other material) inserts. During printing, holes can be punched, and the retaining system of the platen allows the holes to be punched on the sheet. During punching, the punch presses down on and then moves up away from sheet, whereupon it may cause the sheet to move up with the punch (be caught on the punch), so the platen 300 provides a way to hold the sheet down during this process as well. Both printing and punching are done on the same platen to provide registration downstream (i.e., sheet-to-sheet alignment, and image-to-image alignment), as described in U.S. Provisional Patent application No. 62/473,084.

A rough surface (e.g., sandpaper) is used because the carbon fiber sheet is porous and light and tends to move. To hold the sheet down, sandpaper 306 (or other rough surface) is used to create friction that helps prevent X-Y motion of the sheet.

The platen 300 contains a reservoir or depression 312 to accumulate excess ink that passes through the sheet while the sheet is being printed. The amount of air that flows through the depression 312 should be minimized (as small as possible) because the air can disrupt the printing. At the same time, the air opening channels 304 create the air flow necessary to retain the sheet in place. The bed of wire 302, such as fishing wire, supports the sheet so that the sheet does not sag. The wire 302 ensures that the sheet is flat so that the image printed onto the sheet is not distorted (it is essential for the sheet to be flat). Substantially the entire area of the platen 300 correlating to the areas of the substrate sheets where printing will occur should be permeable so that ink can pass through the sheet and be collected in the reservoir or depression 312.

The platen 300 has a sheet releasing mechanism (screws 310) that enables the sheet to be disengaged from the gripper 118. The screws 310 serve as gripper 118 release sites; the magnetic spring-loaded tips 119 of the gripper 118 (see FIG. 12) get attached through magnetism to the screws 310 when the sheet is deposited on the platen 300. When the gripper 118 moves up, the sheet stays on the platen 300 after the gripper 118 releases the sheet.

Figure 7B:
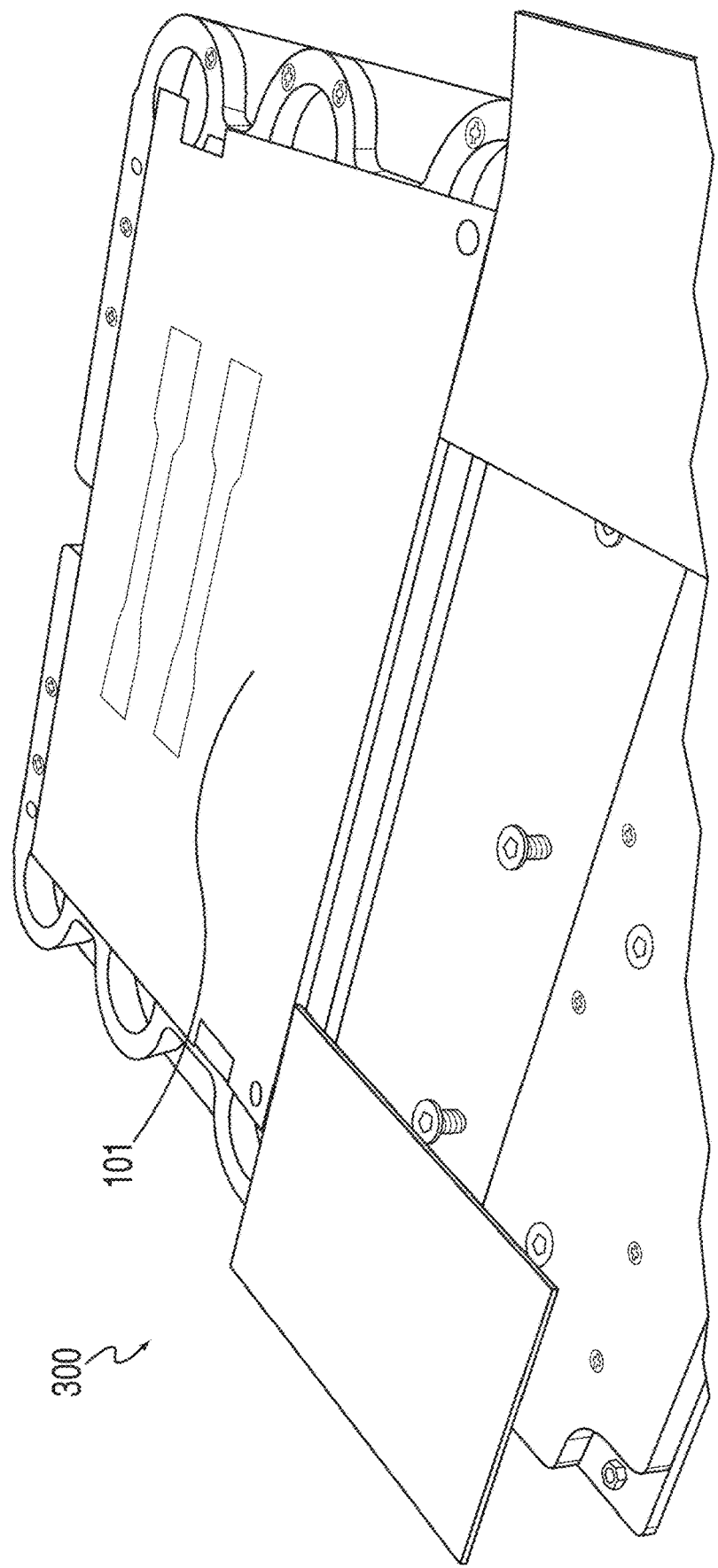
FIG. 7B shows the embodiment of FIG. 7A of the printer platen with a substrate sheet placed on top.
Figure 7C:
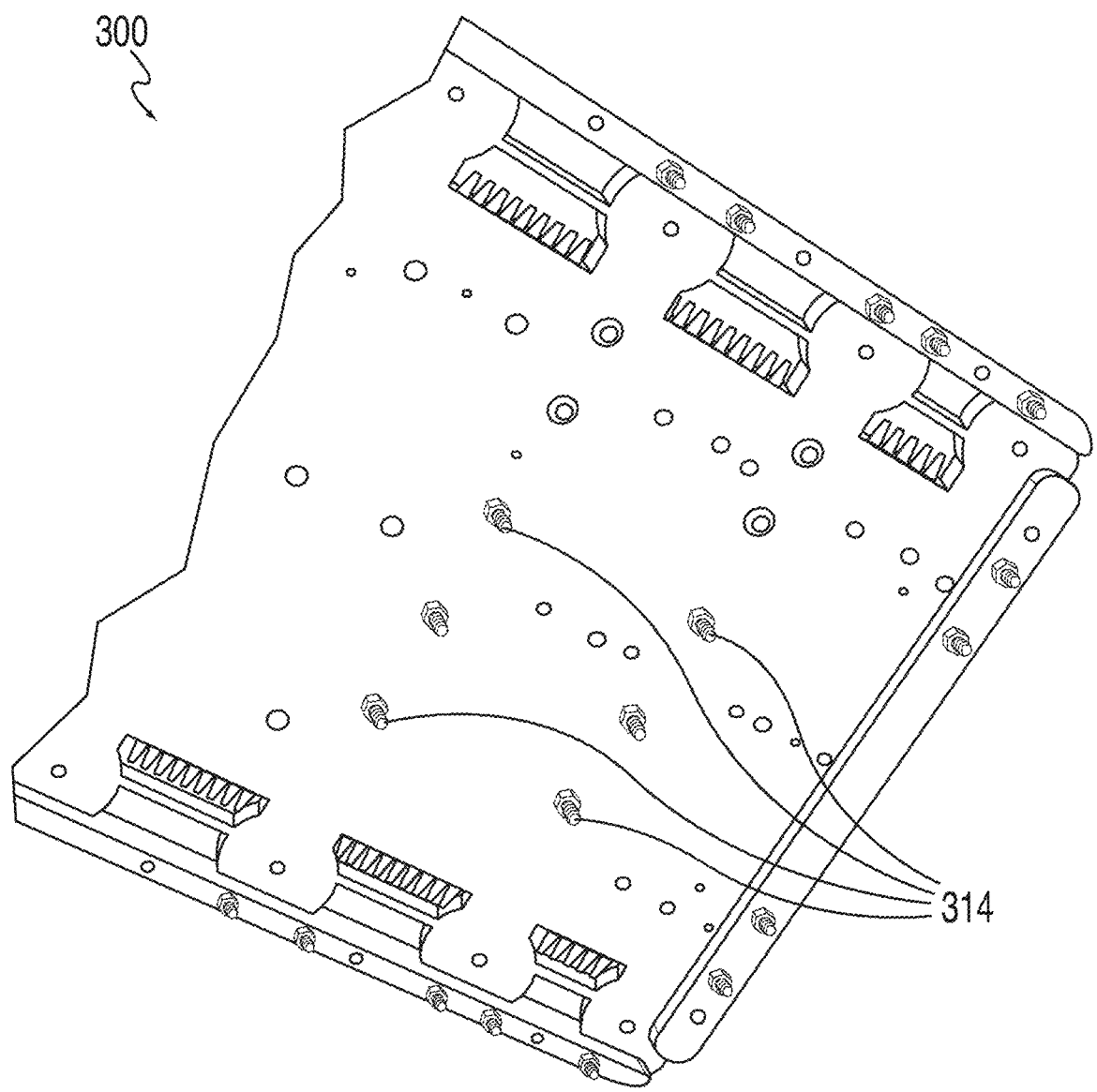
FIG. 7C shows the underside of the embodiment of FIG. 7A.
Figure 7D:
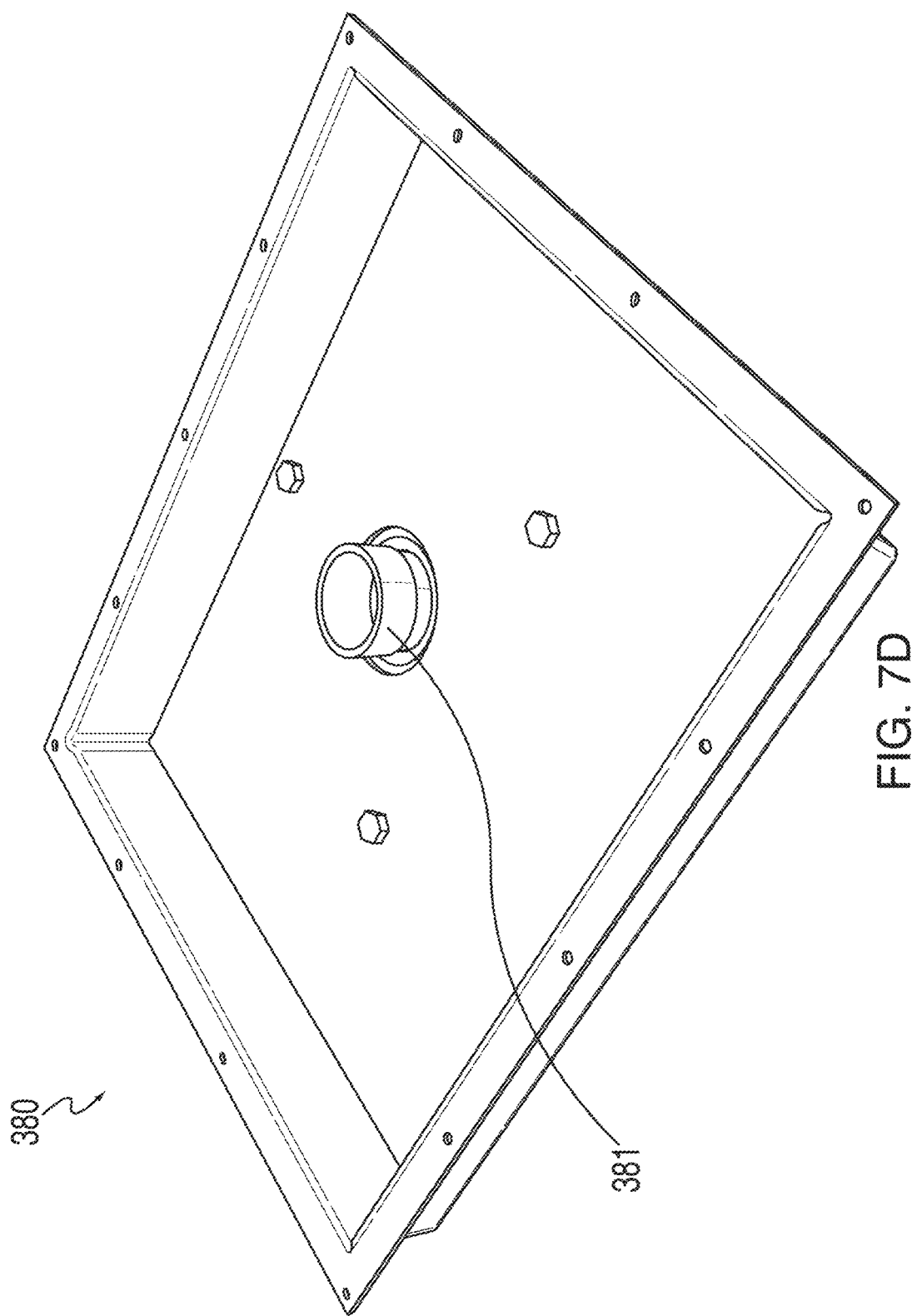
FIG. 7D shows an air plenum which resides directly underneath the printer platen.

FIG. 7B shows the printer platen 300 with a substrate sheet 101 placed on top. FIG. 7C shows the underside of printer platen 300. It shows a configuration with springs 314 for tensioning the wire 302 continuously throughout the platen 300. FIG. 7D shows an air plenum 380 that resides directly underneath the printer platen 300. The air plenum 380 is connected to a motor of a vacuum 381 which is used to suction air through the air channel openings 304 of the platen 300, retaining the sheet while limiting the flow to specific areas of the sheet that are not printed on. FIG. 7E shows the vacuum 381 in greater detail.

Figure 8:
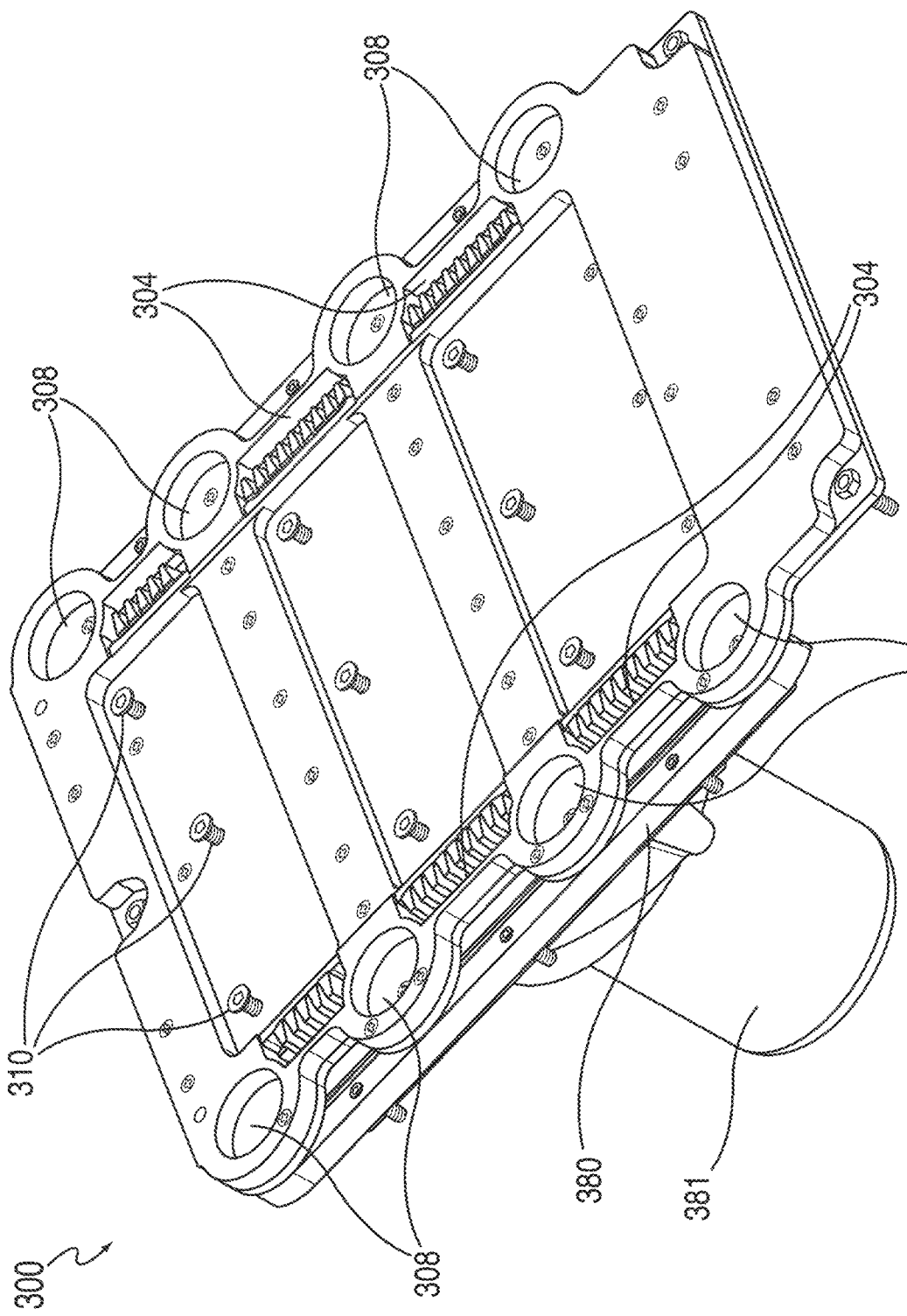
FIG. 8 is a perspective view of the embodiment of FIG. 7A.

FIG. 8 is a perspective view of printer platen 300.

Figure 9:
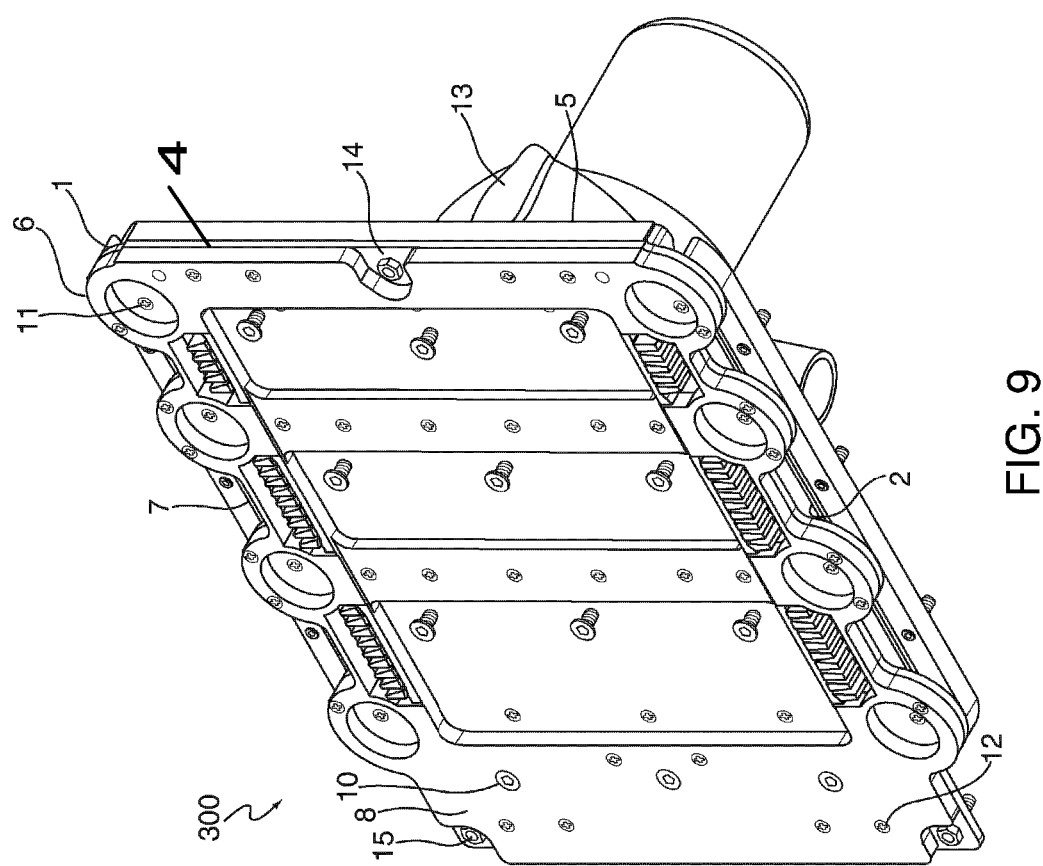
FIG. 9 is another perspective view of the embodiment of FIG. 7A.

FIG. 9 is another perspective view of printer platen 300. This drawing shows the specific engineering components of the apparatus for a particular embodiment of the present invention. The printer platen 300, in a particular embodiment, comprises:

[1] a ¼ inch metal base plate made of ASTM A36 steel,
[2] a 1.51892 mm plenum (item number 2) also made of ASTM A36 Steel,
[4] a ⅜ inch gasket made of silicon rubber,
[5] a motor bracket made of ABS,
[6] a ⅜ inch metal plate made of 6061 Alloy,
[7] two ½ inch support beams made of ASTM A36 steel,
[8] non marring flat point set screws,
(not shown) a black alloy steel flat-head socket cap screw,
[10] black alloy steel flat-head socket cap screws,
[11] 100 degree flat head Phillips machine screws,
[12] zinc-plated stl flat head phil machine screws,
[13] a vacuum motor (item number 13),
[14] a ½ inch supporting front beam made of ASTM A36 Steel,
[15] 101 class 12 steel hex nuts, While a specific list of components have been given for particular embodiment of the present invention, numerous other components and combinations of components are within the scope of the present invention and may be used in different embodiments.

Figure 10:
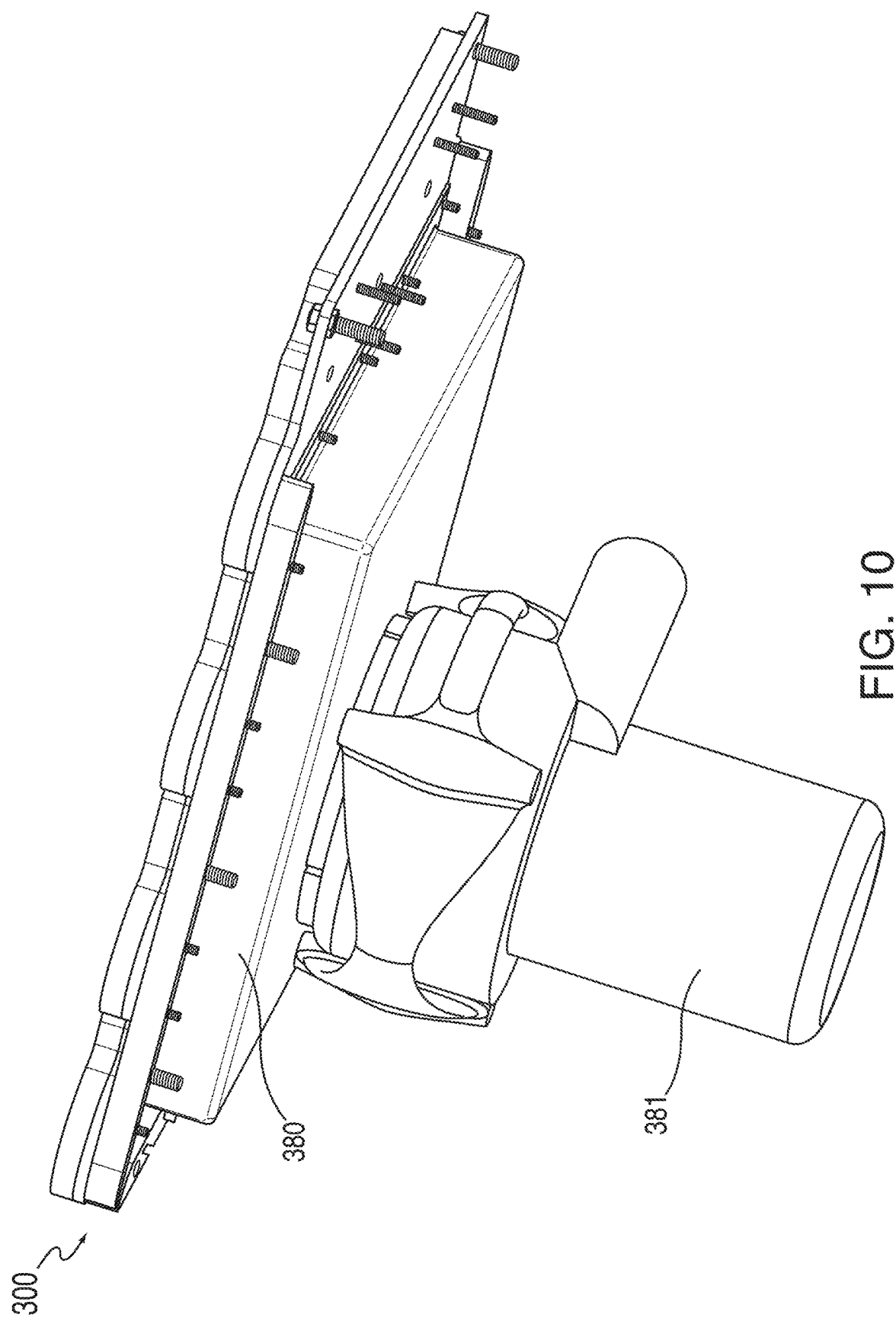
FIG. 10 is a side view of the embodiment of FIG. 7A.
Figure 11:
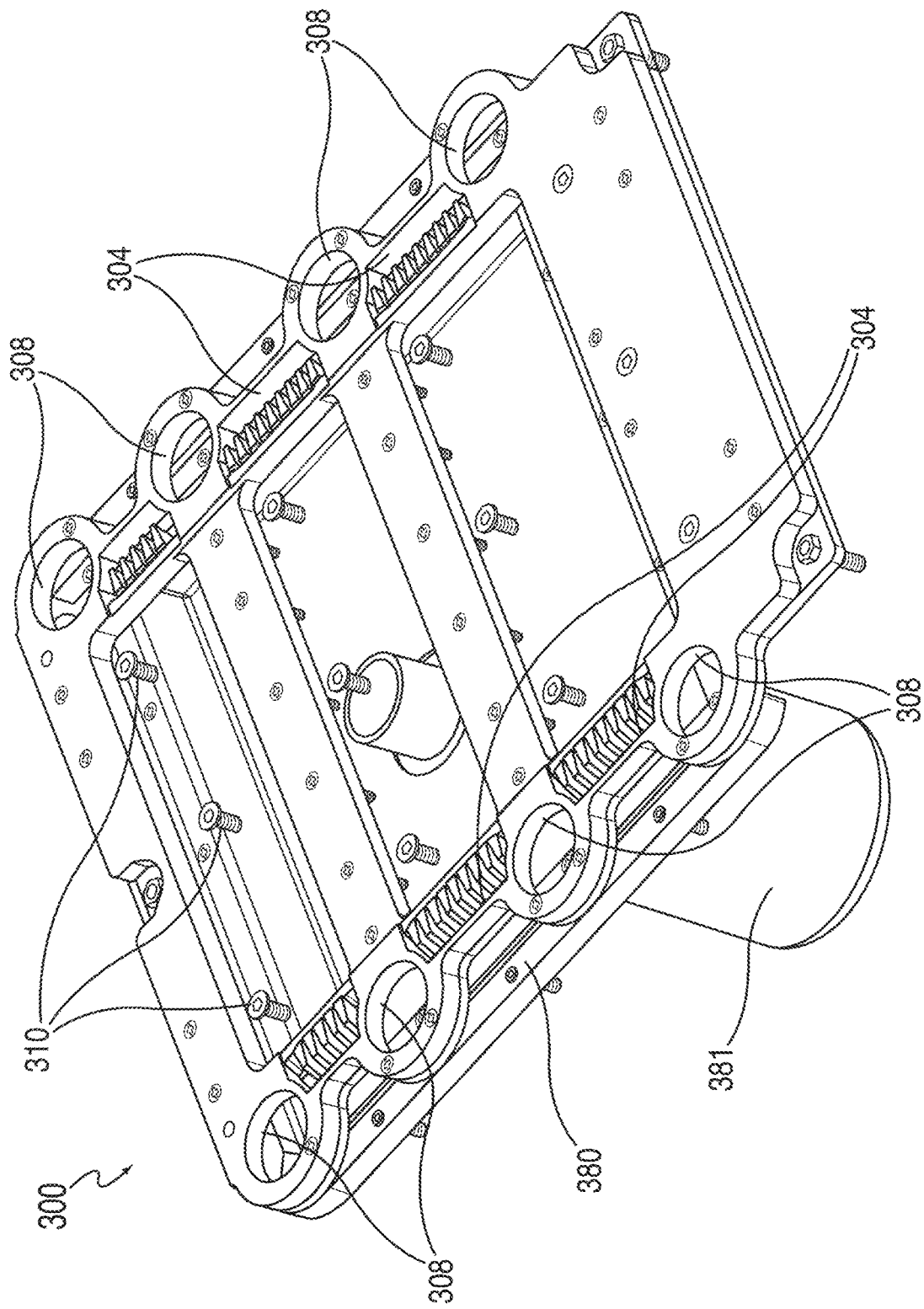
FIG. 11 is a perspective view with partial cutaway of the embodiment of FIG. 7A.

FIG. 10 is a side view of printer platen 300. FIG. 11 is another view of printer platen 300 without wire attached.

Figure 12:
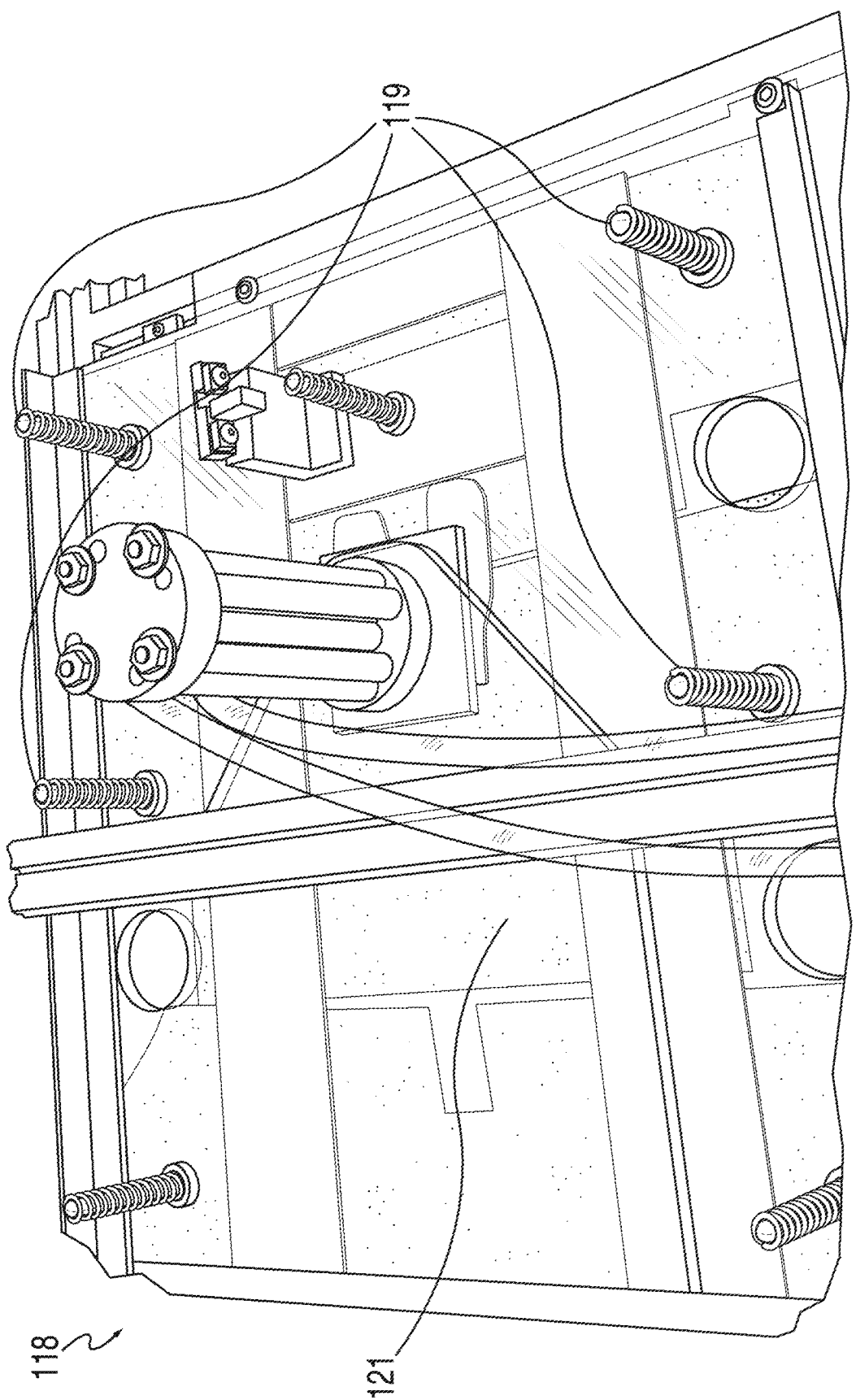
FIG. 12 is a gripper used to transfer the sheet from a material feeder to the printer platen.
Figure 13:
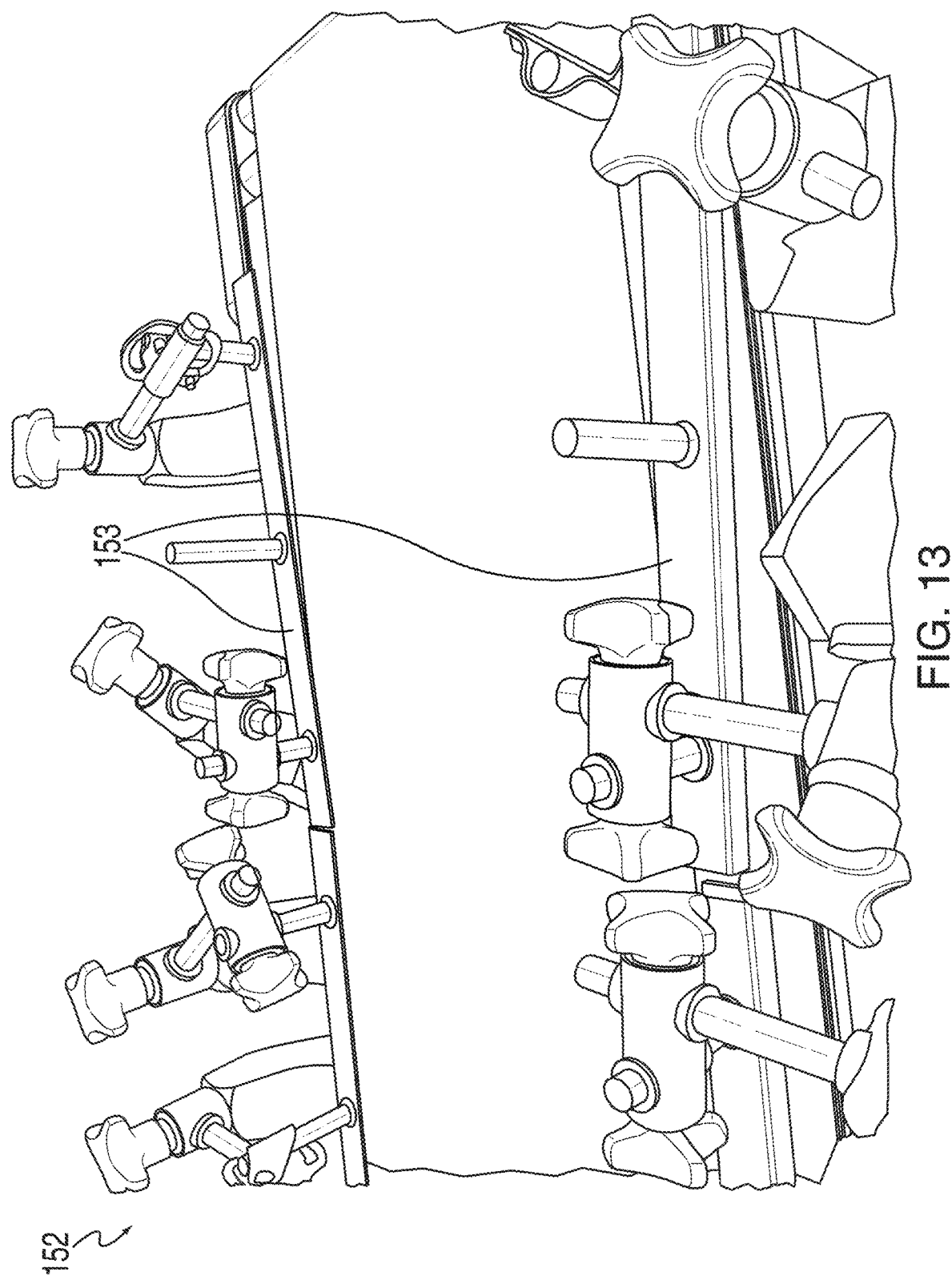
FIG. 13 is a view of a conveyor.
Figure 14:
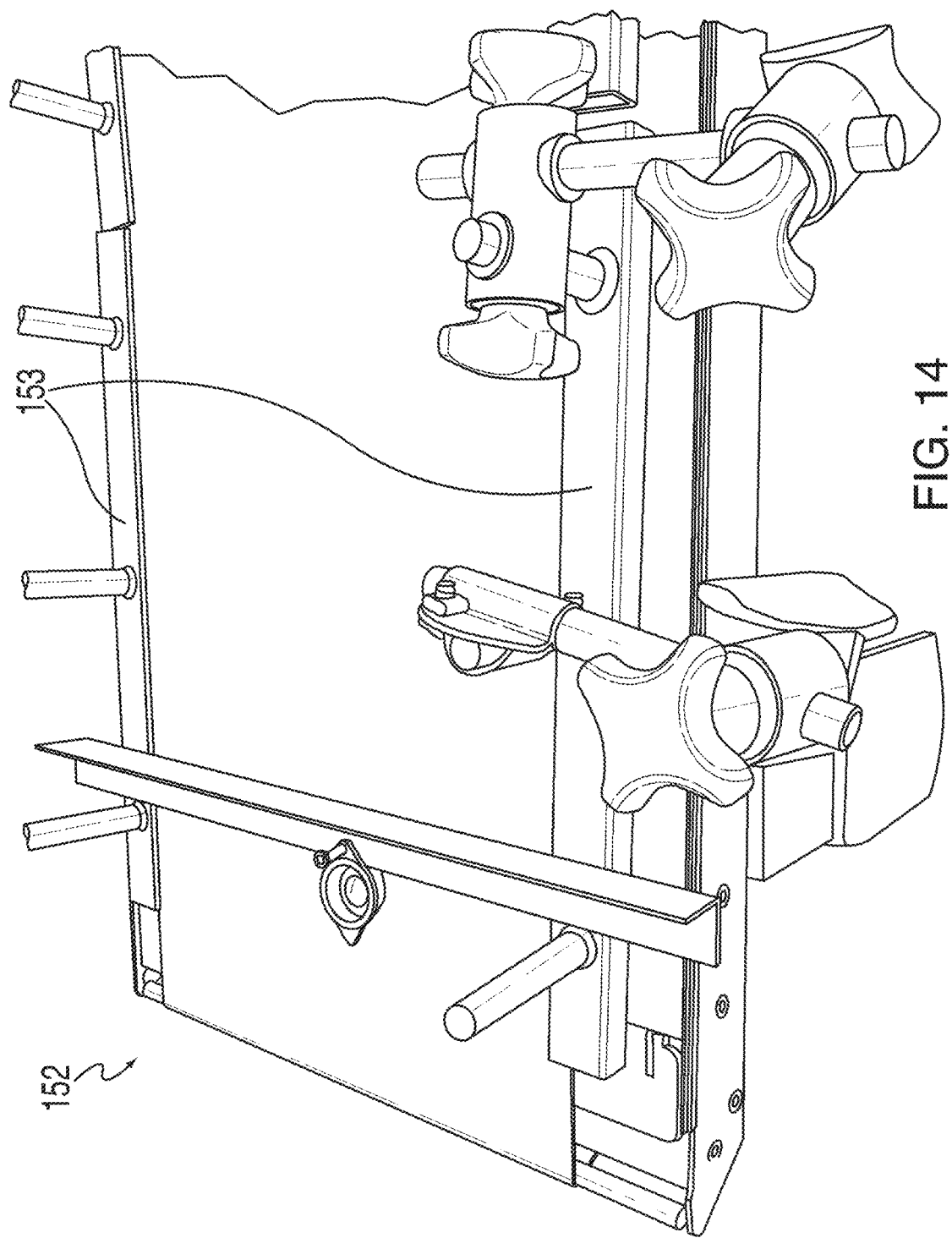
FIG. 14 is another view of the conveyor.
Figure 15:
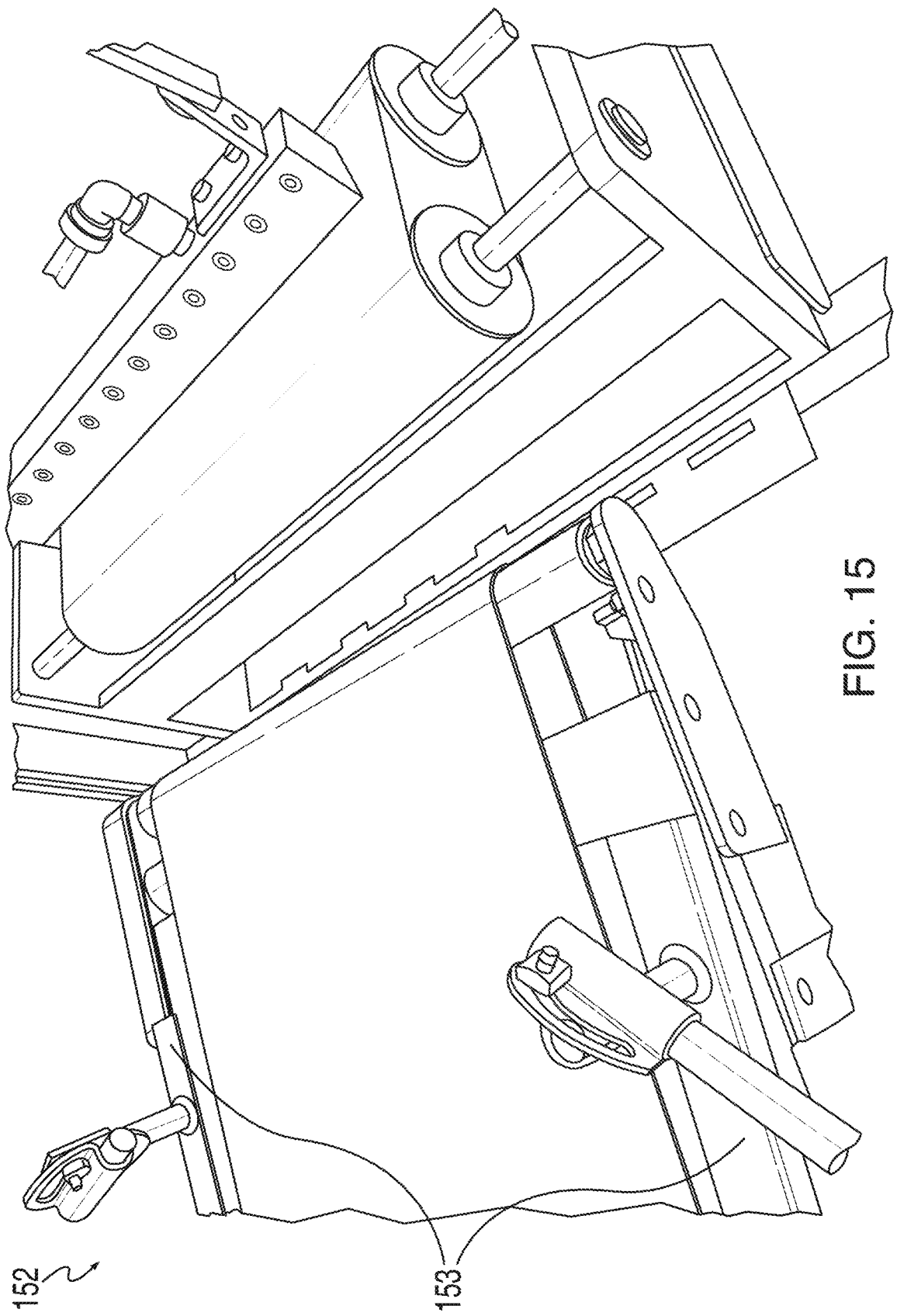
FIG. 15 is another view of the conveyor.
Figure 16:
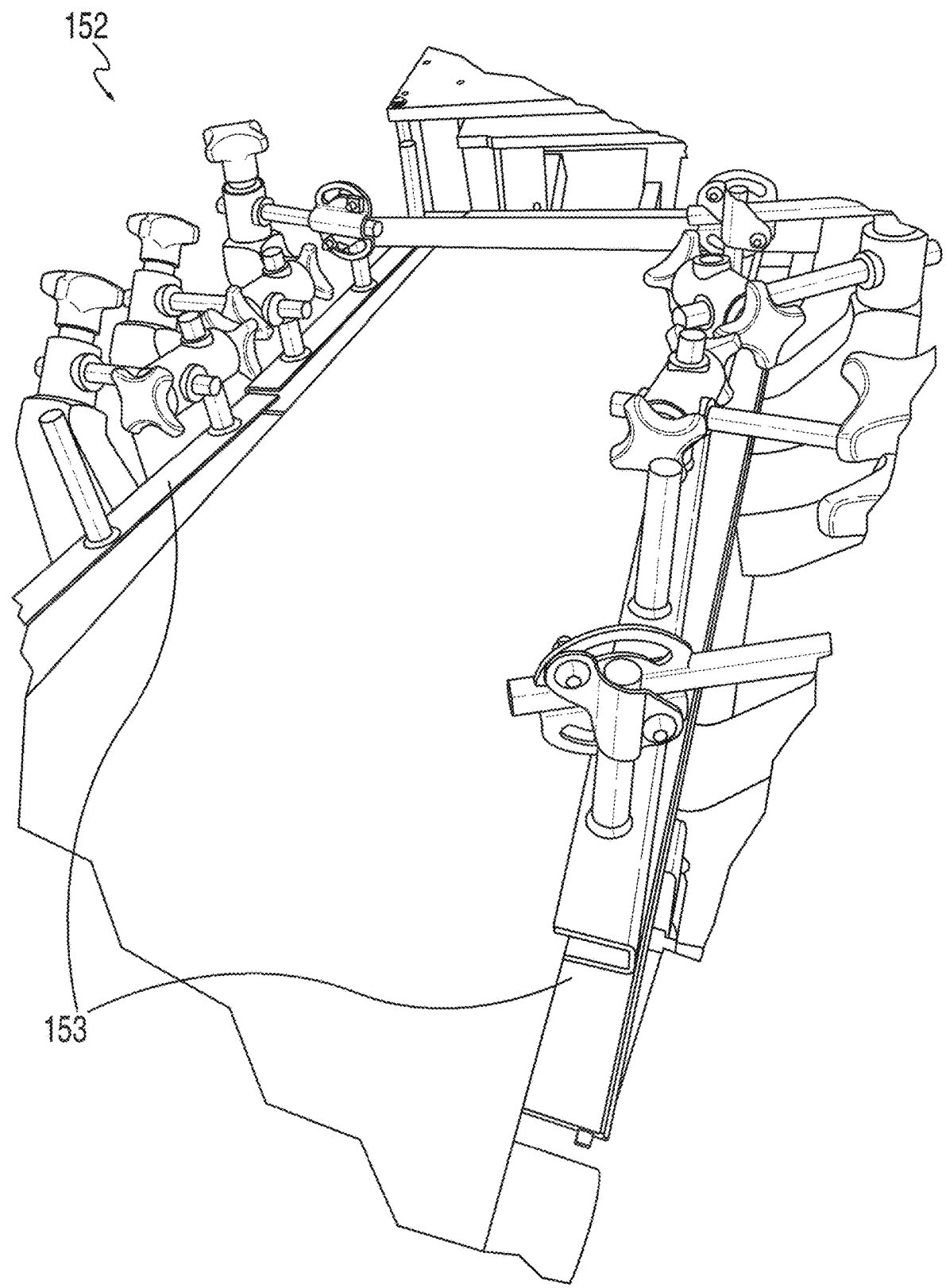
FIG. 16 is another view of the conveyor.
Figure 17:
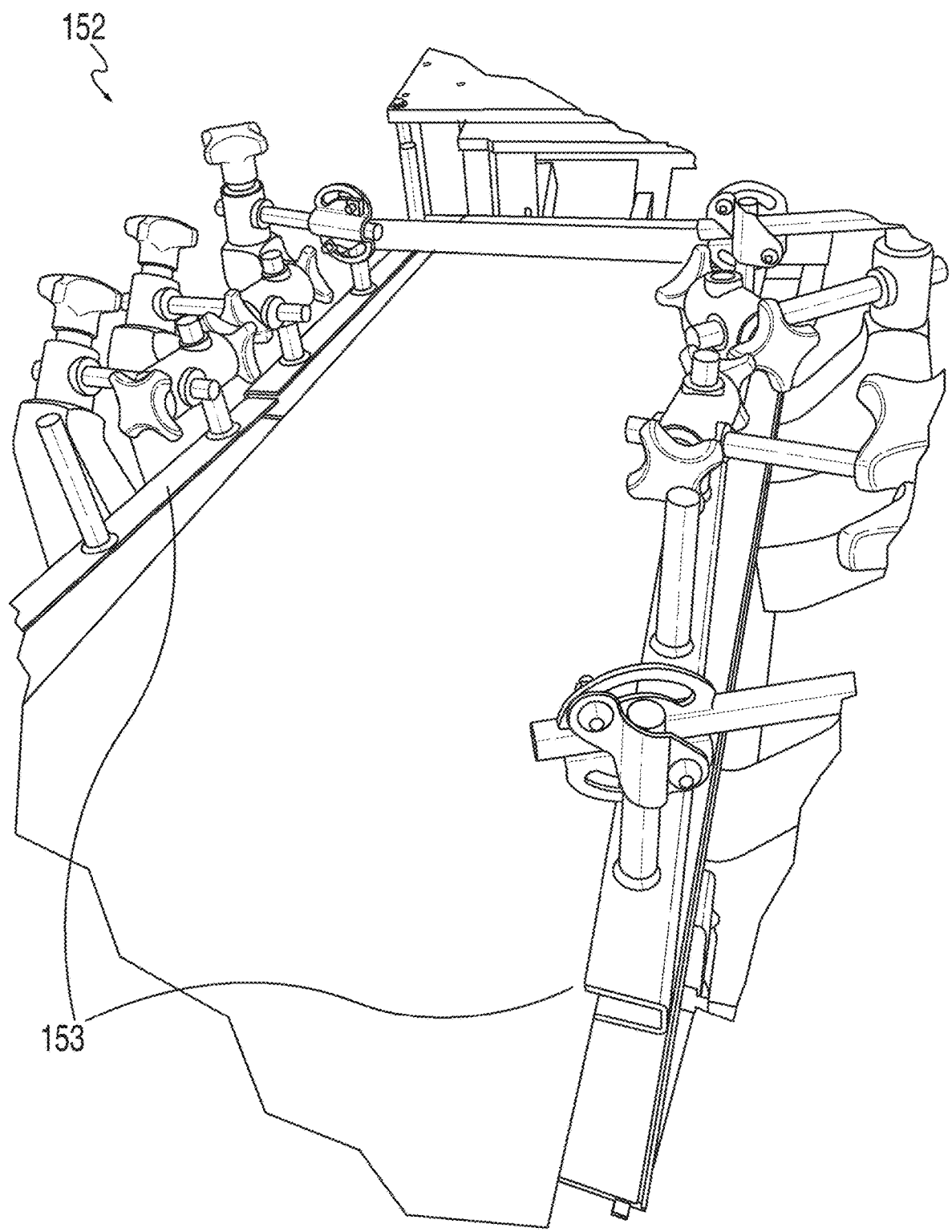
FIG. 17 is another view of the conveyor.
Figure 18:
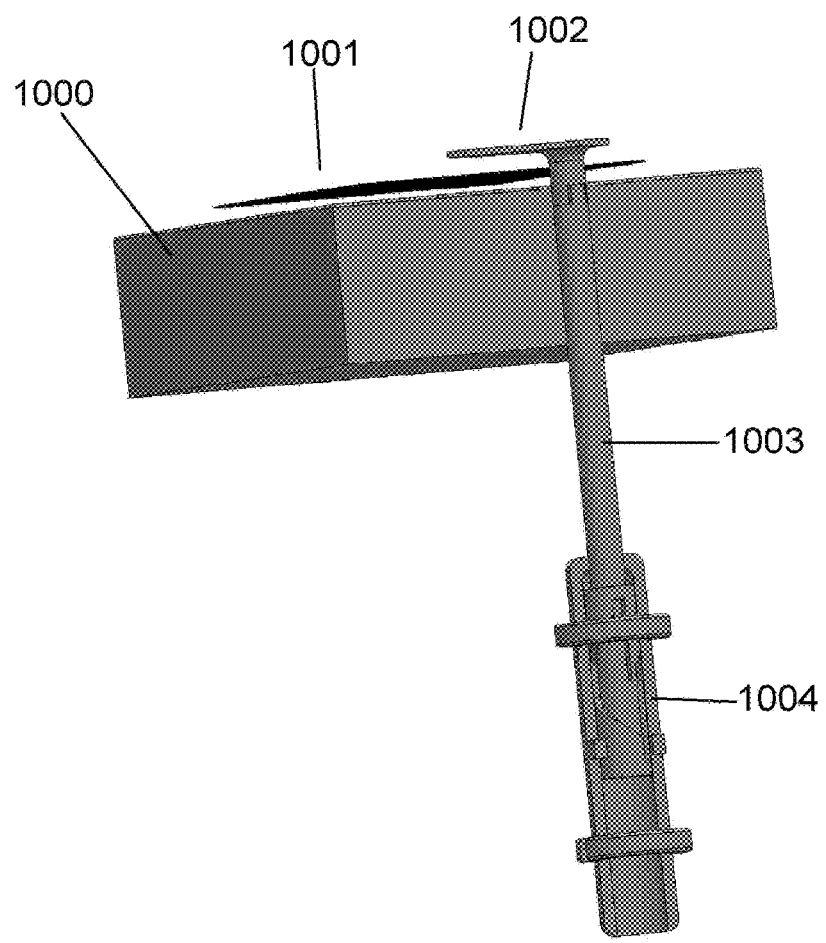
FIG. 18 shows an embodiment of a mechanical hold down.
Figure 19:
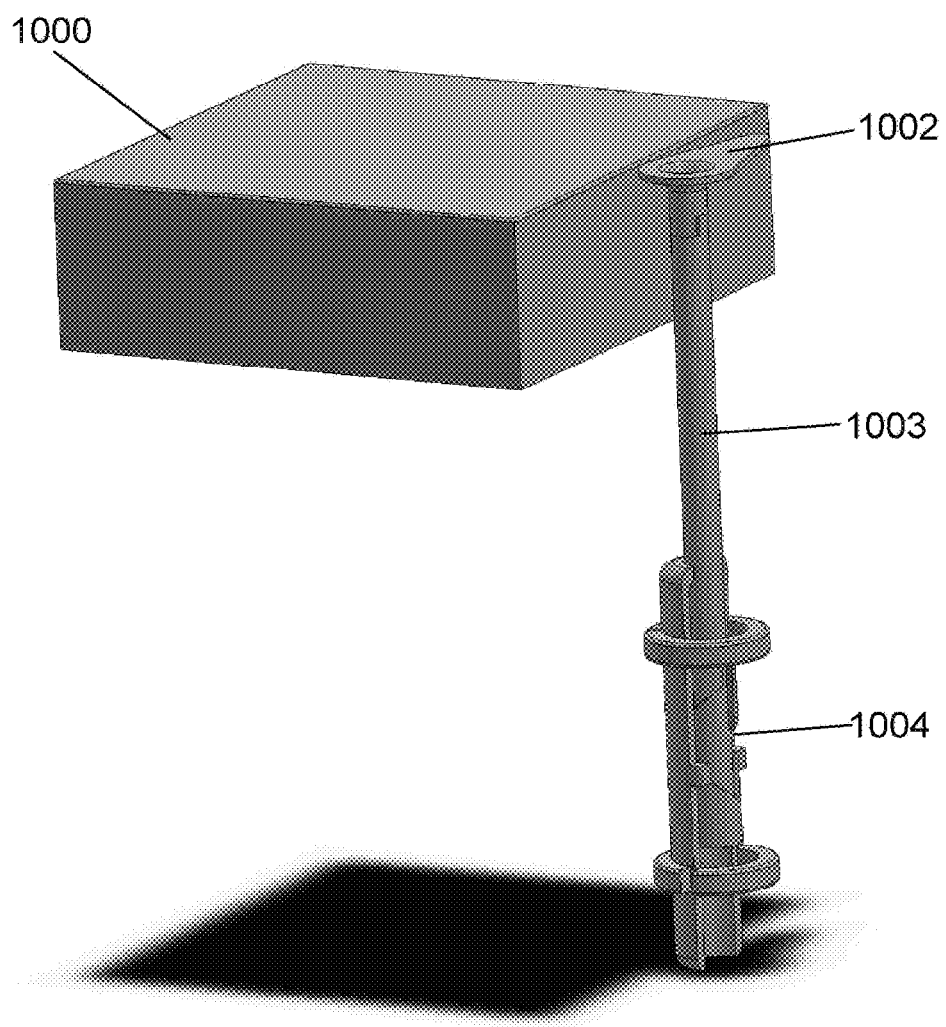
FIG. 19 is a view of the hold down of FIG. 18 in the retracted position.
Figure 20:
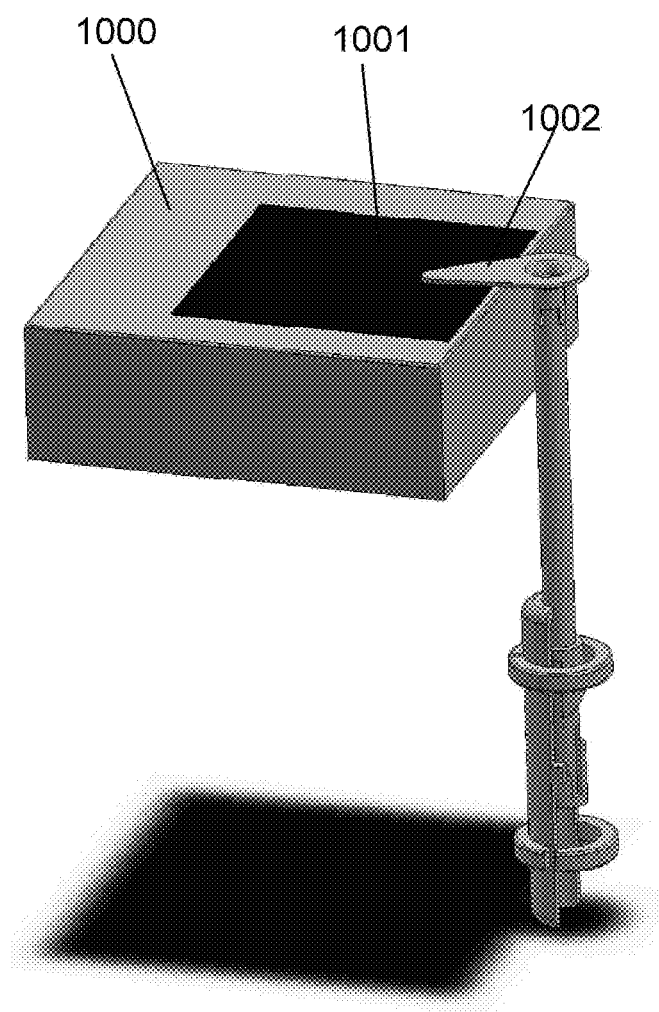
FIG. 20 is a view of the hold down of FIG. 18 in the down or clamped position.
Figure 21:
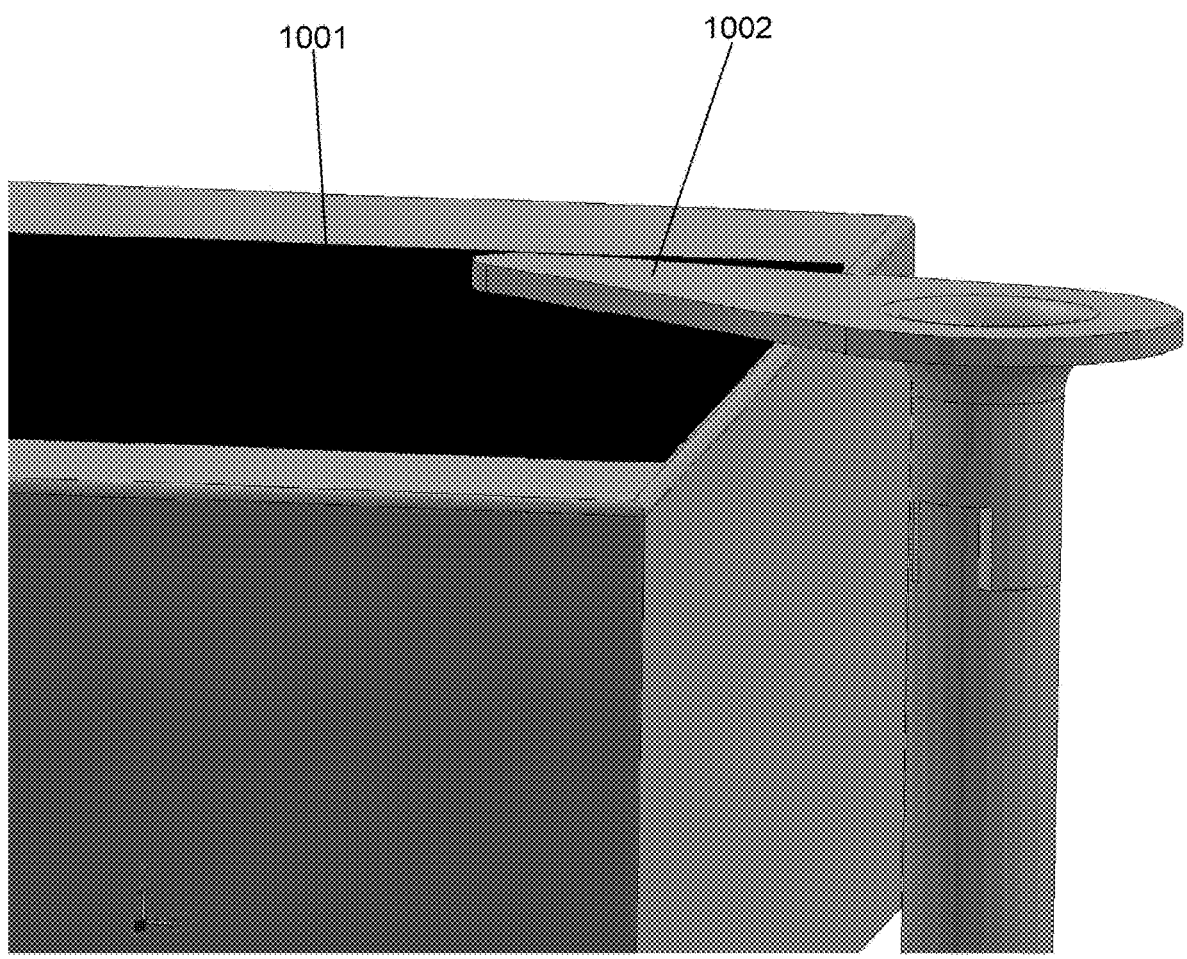
FIG. 21 is a close up view of the hold down of FIG. 18 in the clamped position.

FIG. 12 is a gripper 118 used to transfer the sheet from the material feeder 102 to the printer platen 300. It shows felt 121 and spring-loaded pins 119 having magnetic tips which cooperate with the screws 310 on the platen 300 for releasing the sheet 101 onto the platen 300. Application PCT/US17/17672 explains this operation in more detail.

FIGS. 13-17 illustrate an example conveyor 152 with channels 153. The channels 153 align the sheet 101 if it has been not rectilinear with respect to the conveyor 152. The conveyor 152 is used to help transfer the substrate sheet from the platen 300 to the powder recycling system 500.

As an alternative to the use of a vacuum to hold down the sheet, a system of mechanical hold downs can be used. In this instance a device that uses a system much like a ball point pen can be attached to the flat area 1000. It has a tab 1002 on a shaft 1003 which is connected to a mechanism 1004 shown in FIGS. 18-21. An air cylinder, motor or solenoid moves the shaft up, and gravity allows it to fall. To hold down the sheet, the tab 1002 is moved down to hold the sheet 1001 on the flat surface 1000. It then moves up to release the sheet. As would be understood by someone skilled in the art there are innumerable ways to raise and lower the tab and hold the sheet mechanically.

While the above specification and examples provide a description of the invention, many embodiments of the invention can be made without departing from the spirit and scope of the invention. It is to be understood that the foregoing embodiments are provided as illustrative only, and do not limit or define the scope of the invention. Various other embodiments are also within the scope of the claims.

What is claimed is:

1. A platen apparatus for use as a printing location within an additive manufacturing system, comprising:
    a plurality of horizontal wires arranged in a plane above a reservoir space, the horizontal wires constructed to act as a bed to support a substrate sheet; the wires sized with diameter sufficiently small so that liquid passing through the substrate sheet continues downward into the reservoir space without clinging to the wires, thus keeping the substrate sheet dry on its underside; and
    a retractable mechanical arm system comprising an engaged position and a retracted position, constructed to pin the substrate sheet in a fixed position for printing when in the engaged position;
    whereby the retractable mechanical arm system prevents movement of the substrate sheet during printing.

2. The platen apparatus of claim 1 wherein, the reservoir space located under the plurality of wires accumulates excess liquid that flows through the substrate sheet while the substrate sheet is being printed.

3. The platen apparatus of claim 1 further comprising a plurality of punching sites arranged along the sides of the platen apparatus that allow holes to be punched in the substrate sheet during printing.

4. The platen apparatus of claim 3, wherein the punching sites include inserts made of a wood.

5. The platen apparatus of claim 3, wherein at least one frictional area exists in contact with the underside of the substrate sheet when the substrate sheet is seated on the plurality of wires, the frictional area constructed to prevent movement of the substrate sheet during printing, and said frictional area surrounds one or more of the punching sites, connections between the punching sites, and a perimeter of the platen apparatus.

6. The platen apparatus of claim 5, wherein the frictional area is sandpaper.

7. The platen apparatus of claim 1 wherein the retractable mechanical arm system rotates to change from the engaged position to the retracted position.

8. The platen apparatus of claim 7 wherein the retractable mechanical arm system changes height with respect to the bed.

9. The platen apparatus of claim 1, further comprising a plurality of screws made of ferromagnetic material positioned within the reservoir space such that heads of said screws lie adjacent to the horizontal wires and remain exposed, whereby magnetic tips of spring-loaded pins of a different part of the additive manufacturing system may capture substrate sheets between the spring-loaded pins and the heads of the ferromagnetic screws of the platen apparatus.

10. The platen apparatus of claim 1, wherein an underside of the platen apparatus has a plurality of springs configured to tension the plurality of wires continuously throughout the platen apparatus, to ensure that the substrate sheet is flat so that an image printed onto the substrate sheet is not distorted.

11. The platen apparatus of claim 1, wherein the retractable mechanical arm system occupies an edge of the bed, so that an edge of substrate sheets may be pinned down during printing.

12. A platen for use during a printing stage of an additive manufacturing process, comprising:
    a plurality of wires arranged in a plane over a reservoir and constructed to support a substrate sheet, the plane comprising an edge;
    a hold down pins adjacent the edges of the plane for holding down a substrate sheet that the plurality of wires supports during printing.

* * * * *